US008799758B2

(12) United States Patent
Szeto

(10) Patent No.: US 8,799,758 B2
(45) Date of Patent: Aug. 5, 2014

(54) METHOD AND SYSTEM OF ENHANCED MESSAGING

(75) Inventor: Christopher Tzann-en Szeto, Santa Clara, CA (US)

(73) Assignee: Yahoo! Inc., Sunnyvale, CA (US)

( * ) Notice: Subject to any disclaimer, the term of this patent is extended or adjusted under 35 U.S.C. 154(b) by 617 days.

(21) Appl. No.: 12/332,892

(22) Filed: Dec. 11, 2008

(65) Prior Publication Data
US 2009/0094511 A1 Apr. 9, 2009

Related U.S. Application Data

(63) Continuation of application No. 10/798,193, filed on Mar. 11, 2004, now Pat. No. 7,487,441.

(51) Int. Cl.
G06F 3/00 (2006.01)

(52) U.S. Cl.
USPC .......................................... 715/204

(58) Field of Classification Search
USPC .................... 715/234, 243, 254, 255, 204
See application file for complete search history.

(56) References Cited

U.S. PATENT DOCUMENTS

| 6,452,609 | B1 * | 9/2002 | Katinsky et al. ............... 715/716 |
| 6,587,127 | B1 | 7/2003 | Leeke et al. |
| 7,024,431 | B1 | 4/2006 | Kornelson et al. |
| 2002/0154157 | A1 | 10/2002 | Sherr et al. |
| 2003/0126136 | A1 * | 7/2003 | Omoigui ........................ 707/10 |
| 2003/0135464 | A1 * | 7/2003 | Mourad et al. .................. 705/50 |
| 2003/0191816 | A1 * | 10/2003 | Landress et al. .............. 709/219 |
| 2003/0192044 | A1 | 10/2003 | Huntsman |
| 2003/0193558 | A1 * | 10/2003 | Doss et al. ................. 348/14.01 |
| 2003/0236836 | A1 | 12/2003 | Borthwick |
| 2004/0019653 | A1 | 1/2004 | Debaty et al. |
| 2004/0024822 | A1 | 2/2004 | Werndorfer et al. |
| 2004/0073693 | A1 * | 4/2004 | Slater et al. .................... 709/231 |
| 2004/0117647 | A1 * | 6/2004 | Ballard ........................ 713/200 |
| 2004/0261023 | A1 | 12/2004 | Bier |
| 2005/0010475 | A1 | 1/2005 | Perkowski et al. |
| 2005/0108328 | A1 * | 5/2005 | Berkeland et al. ............ 709/204 |
| 2005/0131992 | A1 | 6/2005 | Goldstein et al. |
| 2005/0160167 | A1 | 7/2005 | Cheng et al. |
| 2005/0188016 | A1 | 8/2005 | Vdaygiri et al. |
| 2005/0197164 | A1 * | 9/2005 | Chan ............................. 455/566 |
| 2006/0146765 | A1 * | 7/2006 | Van De Sluis et al. ........ 370/338 |

OTHER PUBLICATIONS

International Search Report (PCT/US05/07785) dated Jul. 18, 2008; 1 page.

(Continued)

Primary Examiner — Kyle Stork
(74) Attorney, Agent, or Firm — James J. DeCarlo; Greenberg Traurig, LLP

(57) ABSTRACT

Methods and apparatus for providing rich media for enhancing user interaction with a messaging program. The rich media includes user perceptible content and content specific information. User perceptible content may include a small animated picture with an embedded sound file that messaging program users can send to each other during a messaging session. Content specific information may include a description of the perceptible content, context menu items including universal resource identifiers that link to information related to the content and information related to other messaging program content. In addition computer code is provided to allow communication between the rich media and the messaging program so that the messaging program and the rich media can interoperate.

46 Claims, 16 Drawing Sheets

(56) References Cited

OTHER PUBLICATIONS

ChatAbles: 1 click cool, Archived Jun. 3, 2002, [online], [retrieved on Mar. 16, 2004], Retrieved from Internet Archive Wayback Machine <http://web.archive.org/web/20020603194613/http://www.chatables.com/>.

ChatAbles Homepage, Archived Aug. 8, 2002, [online], retrieved on Mar. 16, 2004, Retrieved from Internet Archive Wayback Machine <http://web.archive.org/web/20021201134414/http://www.chatables.net/site/>.

ChatAbles Features, Archived Aug. 8, 2002, [online], retrieved on Mar. 16, 2004, Retrieved from Internet Archive Wayback Machine <http://web.archive.org/web/20021201134414/http://www.chatables.net/site/features.htm>.

N-Tonic Creative Design Services, [online], retrieved on Mar. 16, 2004, Retrieved from N-Tonic Homepage <http://www.n-tonic.com/content.php>.

Chatables 3.0, Released 2002, [Note: Setup File Available on Enclosed CD].

* cited by examiner

METHOD AND SYSTEM OF ENHANCED MESSAGING

CROSS REFERENCE TO RELATED APPLICATIONS

This application is a continuation of and claims the benefit of U.S. patent application Ser. No. 10/798,193, filed Mar. 11, 2004 now U.S. Pat. No. 7,487,441, entitled "Method and System of Enhanced Messaging".

BACKGROUND OF THE INVENTION

1. Field of the Invention

The invention is directed to computer messaging systems, more particularly, to a method and system of enhancing user interaction with such systems.

2. Description of Related Art

Networked computers can provide numerous helpful applications including allowing people in different locations to communicate with each other. The Internet, a global computer network, has become a popular means of communicating from across the room to across the world. The type of communication ranges from simple one on one text instant messaging, to multiple member chat rooms. Some applications also include video and sound capabilities.

Early text messaging or instant messaging applications were limited to sending and receiving text. For various reasons, including incorporating a "mood" to typed text, people started using emoticons. Emoticons are drawings made from keyboard characters. For example placing a smiley face ":)" after some text would indicate a happy or playful tone to the text.

As innovations in Internet technology advanced, additional features were added to messaging applications such as changing background colors, text colors and font types. One popular feature added to instant messaging applications were enhanced emoticons. Using enhanced emoticons, messaging users could send and receive smiley face pictures or icons instead of just text. These pictures can be animated and add entertainment value to a messaging program.

In the spirit of emoticons some messaging programs allowed users to send images of talking heads to each other. The heads would be animated and would play a sound clip. Talking heads became a way to advertise products such as a movie by using the image of characters in the movie.

A deficiency of talking heads and all computer images and icons is that while the image and the voice clip may help to sell a product, the icons and images do not have content specific information that could link an Internet user to a variety of different types of media related to the image or icon. Currently, in Windows™ applications, "right clicking" on an image of movie A will bring up a context menu including menu items that can be selected to manipulate the image. "Right clicking" on an image of movie B will bring up a context menu with the same items. Accordingly, a need exists for an improved method and system for network communications.

SUMMARY OF THE INVENTION

The invention as described and claimed herein satisfies this and other needs, which will be apparent from the teachings herein. An embodiment of the invention includes methods and apparatus for providing rich media for enhancing user interaction with a messaging program. The messaging program provides access to a selection, for example, through a toolbar, of user selectable rich media through a messaging program interface, for example, through a computer application window and/or a graphical user interface (GUI). The rich media comprises user perceptible content such as, for example, an audio video file, (i.e., digital data containing sound and/or images or other user perceptible information) and content specific information. Created messages that include rich media can be communicated to an intended recipient which may be, for example another user of the messaging program. The rich media is received by the intended recipient for perception and, in addition, the intended recipient has access to the rich media. In an alternate embodiment rich media is assigned an identification tag. Messages that are sent between users of the messaging program include the identification tag of a particular rich media instead of the media itself. The rich media can be obtained by a user, for example, from a server or other storage device, using the identification tag.

One example of rich media is an enhanced icon. Enhanced icons are small images that preferably can be animated and that include motion and sound. Enhanced icons can be implemented, by way of non-limiting example, as flash vector animation files (SWF) embedded with a sound file such as an MP3 file. Since enhanced icons can be animated images, they can represent anything from scenes of nature to characters in a movie. In addition, through the use of the embedded sound file the scenes of nature can be set to, for example, classical music and/or a character in the scene can be made to "speak." For example, an animated movie character could "speak" a line from the movie. Once a user receives an enhanced icon they may save the enhanced icon and send the enhanced icon to other users of the messaging program who in turn can save the enhanced icon and send it to other users. In this way enhanced icons can spread in a viral manner to many users of the messaging program, making them an ideal marketing vehicle.

In addition, in the described embodiments computer code is provided to allow communication between the rich media and the messaging program so that the rich media and the messaging program can interoperate. An example of how the computer code allows the rich media and the messaging program to interoperate is by giving the messaging program the ability to control the rich media that is playing at any given time. For example, if a first rich media item is playing while a user sends or receives a second rich media item, the computer code allows the messaging program to stop the playing of the first rich media item and start playing the second rich media item. In addition, when a mouse pointer is placed over a particular item of rich media, the computer code can allow the messaging program to display a caption spoken by the rich media and/or display a description of the sounds played by the rich media. The caption and/or the description may be included in the content specific information which can be part of the rich media.

The computer code also works with the messaging program to display a context menu when a rich media item is appropriately selected, for example, by left or right clicking on the rich media item. Through the computer code the messaging program can populate the context menu using one or more items of the content specific information that is part of the rich media. The content specific information may include a description of the rich media and/or a transcription of the words spoken by the rich media, context menu items including universal resource identifiers (URI) which link to related content on the Internet and information related to other messaging content. An exemplary URI is a universal resource locator (URL). Content specific information allows different rich media to include different information. For example, rich media items related to movies can include content specific information that are links to movie trailers while rich media items that are related to music may include content specific information that are links to music clips from a group's latest album.

A messaging program user may be a user of a messaging service that is operated by an Internet content provider. As part of the messaging service a user may log in to a messaging service once the user initiates the messaging program. This may be done by offering the user a log in interface or the log in process may be automatic. The messaging service can track the user's preferences and rich media selections and save the selections and preferences so that the user preferences and rich media selections are available to the user regardless of the computer from which the user accesses the messaging service. In addition, the messaging service can track user statistics related to the usage of the rich media for various purposes including, by way of non-limiting example, advertising, marketing, research and/or customer service purposes. The messaging service can also allow a content provider to automatically update a user's rich media selection by adding new or recommended rich media or by removing expired rich media. The messaging program also allows a user of the messaging program to modify their rich media selection. For example, the user may add, remove and/or reorder their rich media selection.

Other objects and features of the invention will become apparent from the following detailed description, considered in conjunction with the accompanying drawing figures. It is understood, however, that the drawings are designed solely for the purpose of illustration and not as a definition of the limits of the invention, for which reference should be made to the appended claims.

BRIEF DESCRIPTION OF THE DRAWING FIGURES

In the drawing figures, which are not to scale, and which are merely illustrative, and wherein like reference numerals depict like elements throughout the several views.

DETAILED DESCRIPTION OF EXEMPLARY EMBODIMENTS

There will now be shown and described in connection with the attached drawing figures several exemplary embodiments of a system and method of enhanced messaging.

Figure 1:
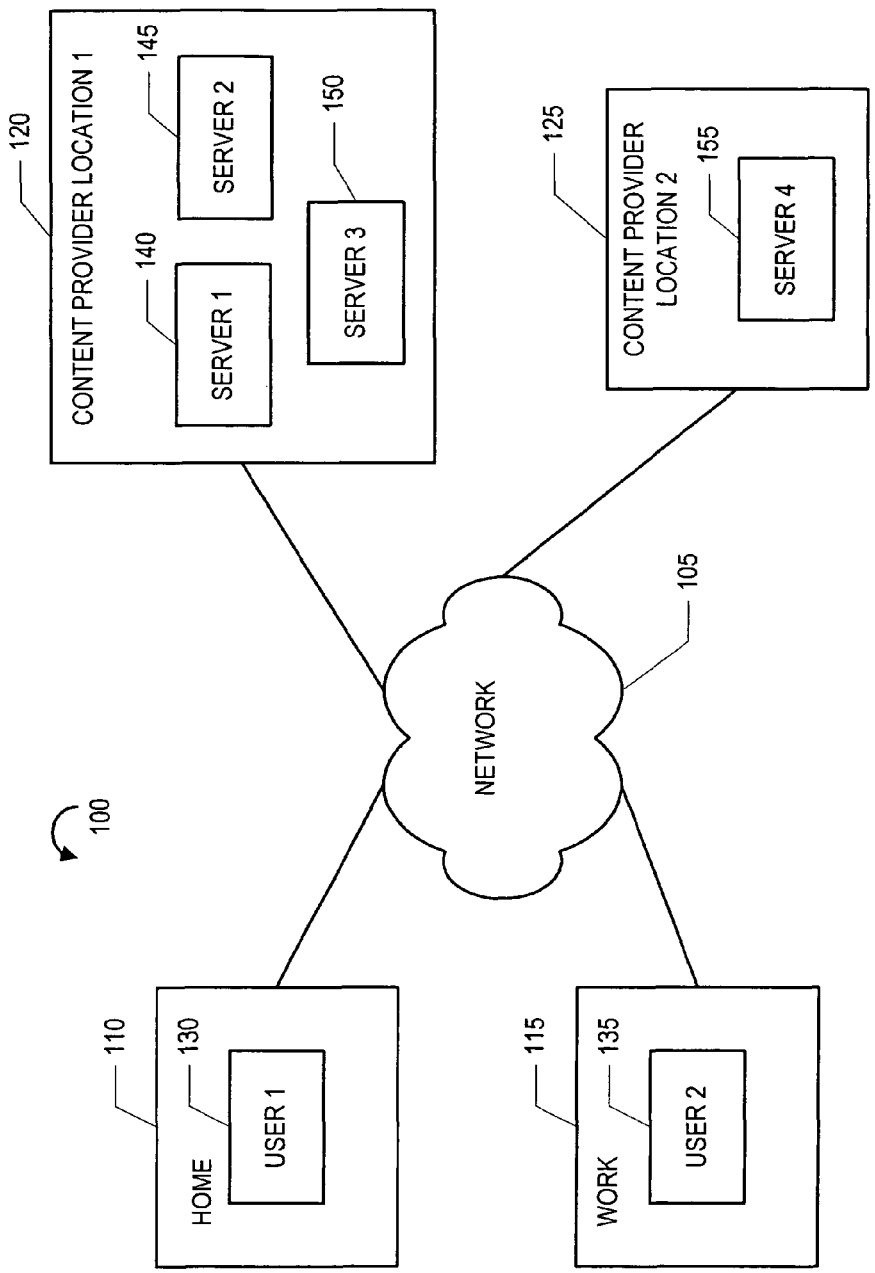
FIG. 1 is a schematic illustrating an exemplary system implemented according to an embodiment of the invention.

With reference to FIG. 1, there is shown an exemplary block diagram of a system 100 implemented in accordance with an embodiment of the invention. System 100 includes a network 105, and four locations: home 110, work 115, content provider location one 120 and content provider location two 125, each coupled to the network 105. In an embodiment of the invention the network 105 is the Internet, but in alternate embodiments, the system may also be used over any network of computers including local internets, intranets, local area networks (LANs), wide area networks (WANs), etc. or with any combination of networks.

The enhanced messaging system can be used by a first user 130 located at home 110 and a second user 135 located at work 115 to communicate with each other. While the example illustrated in FIG. 1 shows two users 130, 135 communicating between two separate locations 110, 115, the invention is not limited to the illustrated example. For example an alternative embodiment includes two users located at work 125 communicating with a third user located at home 110, or any other number of persons or locations, the concepts, methods and systems described herein being scalable.

The enhanced messaging system can be provided and supported by an Internet content provider, which can have one or more locations such as content provider location one 120 and content provider location two 125. FIG. 1 illustrates two locations, but a content provider is not limited in the number of locations it can utilize. Content provider location one 120 includes server one 140, which can be a messaging service server; server two 145, which can be a staging server; and server three 150, which can be a production server. Content provider location two 125 includes server four 155, which can be an additional production server. While a content provider may have separate servers that perform separate functions, alternatively one or more servers may perform one or more functions each. In addition, the content provider can place the servers 140, 145, 150, 155 in any location 120, 125 in any manner known, or to become known in the art. Further properties of the servers are described later with reference to FIG. 3.

Figure 2:
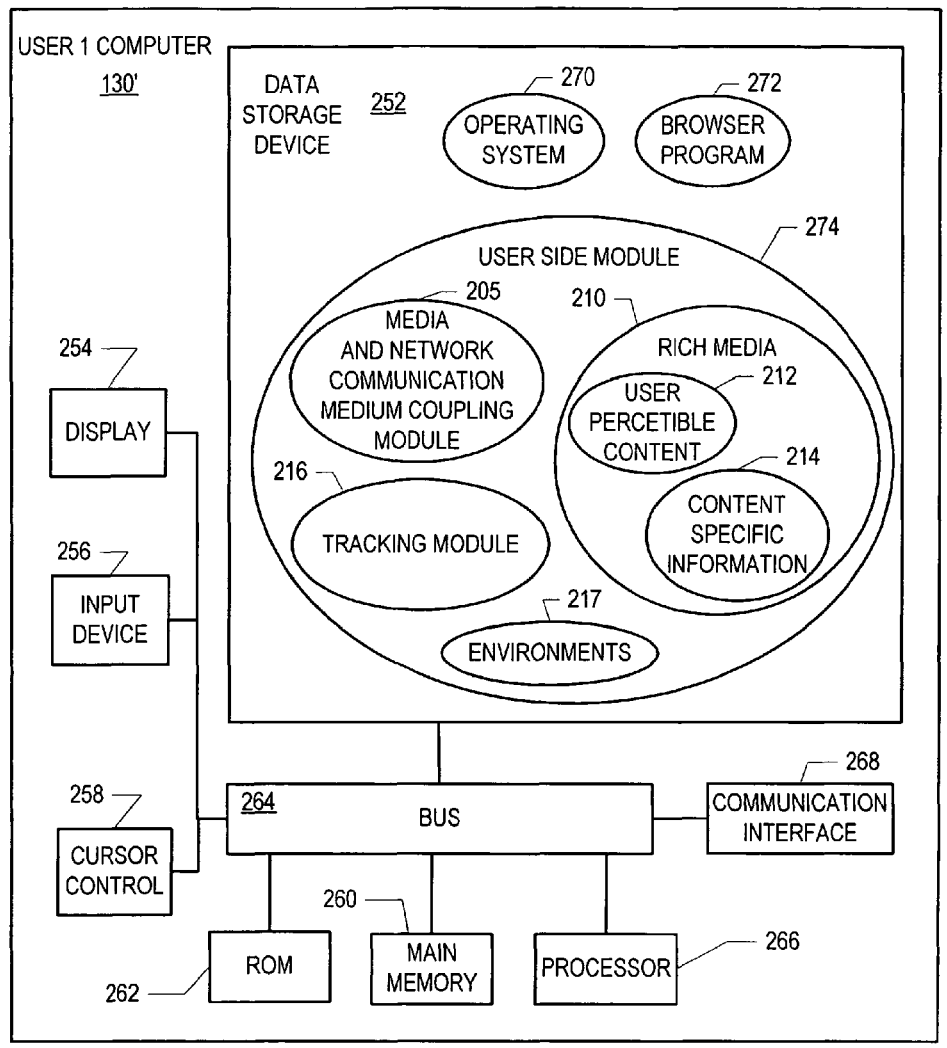
FIG. 2 is a schematic illustrating an exemplary computer implemented according to an embodiment of the invention.

User one 130 of FIG. 1 includes a user and a network communication medium. The communication medium may be a computing device. FIG. 2 illustrates an exemplary computing device computer 130'. Computer 130' comprises a display 254, an input device 256, a cursor control 258, ROM 262, main memory 260, a processor 266, and a communication interface 268, coupled together by bus 364. The computer 130' communicates with the network via the communication interface 268, which may be implemented as, by way of non-limiting example, a Network Interface card (NIC).

The main memory 260 may be implemented as, by way of non-limiting example, Random Access Memory (RAM) and/or other dynamic memory storage device. Various input and output devices are provided as part of computer 130', including, by way of non-limiting example, a display 254, for example, cathode ray tube (CRT), liquid crystal display (LCD), etc., an input device 256 such as a keyboard, and a cursor control device 258 such as a mouse, or trackball, for example.

The computer 130' also includes a data storage device 252, which is coupled to the bus 264. The data storage device 252 may be implemented as, by way of non-limiting example, a magnetic disk drive and magnetic disk, a CD-ROM drive and CD-ROM, or other equivalent devices and data storage mediums. The storage device 252 comprises computer code defining an operating system 270, a browser program 272 and a user side module 274, which are described below in further detail. User side module 274 includes media and network communication medium coupling module (coupling module) 205, rich media tracking module 216, environments 217 and rich media 210. Rich media 210 comprises user perceptible content and content specific information. While depicted as a computer, the computing device may be any device that can utilize a messaging program, such as, by way of non-limiting example, a notebook computer, personal digital assistant (PDA), cell phone and the like.

In accordance with an embodiment of the invention and in the descriptions of exemplary methods and apparatus of the invention, the user side module 274 may be implemented as a messaging program 274. The messaging program 274 can be a multi-function application the can provide many features including an instant messaging function, a chat room function, an email function, a calendar, news and stock reports. The plurality of functions can be presented to the user through a plurality of overlapping application windows that can be accessed through an array of messaging program tabs, each tab representing a different function. In alternate embodiments, the messaging program 274 can facilitate the transmission of any type of network message, including and not limited to instant messages, chat room messages, message board entries and/or email messages, for example. The messaging program 274 can be used as part of a messaging service supported by a content provider.

Rich media 210 is comprised of user perceptible content 212 and content specific information 214. In accordance with an embodiment of the invention, and in the description of exemplary methods and apparatus of the invention, rich media 210 may be implemented as an enhanced icon 210. Enhanced icons 210 include user perceptible content 212 that can be implemented as, by way of non-limiting example, audio clips represented by an image that can be animated. The user perceptible content 212 can be associated with products or services. For example the image can be a representation of a character from a movie, and the character can be made to "speak" a line from the movie. Users of the messaging program 274 are given an enhanced icon interface, such as for example a toolbar or menu, that can be filled with a list of favorite enhanced icons. By selecting from the enhanced icon toolbar a messaging service user can include enhanced icons in the messages they send to other messaging program users thereby enhancing their conversations. For example, the availability of rich media items incorporating popular movie characters "speaking" well known phrases can attract network messaging users to a particular content provider's service.

Additionally, since the user perceptible content 212, such as for example, images, can be representations of marketing partner media content, such as, for example, movie characters, TV characters, video game characters, music groups, toys, trademarks, logos, etc., the content provider can use enhanced icons 210 as an advertising platform and charge marketing partners, such as, for example, a movie studio, for using marketing partner specific enhanced icons on the content provider's service. For example, the content provider can charge marketing partners a flat fee for adding marketing partner specific enhanced icons to a messaging service and/or the content provider can charge a marketing partner according to the number of times their enhanced icons have been used.

By implementing certain technical specifications, the work of creating new enhanced icons 210 may be done by an outside contractor and/or a third party marketing partner. Some exemplary technical specifications comprise using a Flash™ vector animation file (SWF) with sound as an MP3 file, including an enhanced icon title and caption, optimizing the enhanced icon to be displayed at 48×48 pixels, having a 50K file size limit and a ten second animation and sound limit with no looping. In this embodiment the user perceptible content 212 and the content specific information 214 are part of the same SWF. Therefore each enhanced icon 210 is one file that can be easily stored and accessed. In an alternate embodiment, the user perceptible content 212 and the content specific information 214 may be separate components from the SWF. The separate components may be associated with each other via XML that describes each of the components of an enhanced icon 210. In response to receiving XML describing an enhanced icon 210, the messaging program 274 can retrieve the separate components that make up the enhanced icon 210. Splitting an enhanced icon 210 into separate components makes it easier to modify or upgrade an enhanced icon 210. For example modifying the audio and context menu items of an enhanced icon 210 for different languages, without the necessity to change the image file.

A resource administrator 312 may be used to monitor new content received from an outside contractor and/or a marketing partner and manage existing content. The new content is validated to make sure it meets the technical specifications, and is rejected if the specification is not met. In alternate embodiments the resource administrator 312 may be able to alter a non-conforming enhanced icon so that it meets the technical specifications. The resource administrator 312 may be implemented as a human operator or the resource administrator 312 may be a computer program that is executed through, for example, a web interface. Marketing Partners can manage their content through the web interface. The resource administrator 312 may be executed as part of a staging module 320 for messaging service content.

The display of enhanced icon captions, which are part of content specific information 214, can be different depending on the audio of the enhanced icon 210. If the enhanced icon 210 represents a person saying something, the caption can be in quotes and italicized, for example: "I love enhanced icons." If the enhanced icon caption describes a sound or action, the caption is only italicized, for example: The Yale Fight Song. A messaging program 274 may limit the size of an enhanced icon 210 for bandwidth and storage conservation and/or to allow faster load times, Additionally, if for example the enhanced icon 210 is implemented as a SWF, a Flash™ loader can be implemented to display something appropriate while an enhanced icon 210 is loading.

Enhanced icons 210, especially popular and well made enhanced icons 210, can quickly spread to many users of a messaging service since a user can add any received enhanced icon 210 to their toolbar, and then send the enhanced icon 210 to a third friend who may also save and use the enhanced icon 210. Thus, a popular enhanced icon 210 can rapidly spread a marketing partner's character (or advertisement) to many messaging service users. The additional exposure of well made and innovative enhanced icons 210 encourages marketing partners to create better enhanced icons 210. The content provider, meanwhile benefits from the advertising revenue and from the added value of creative and popular enhanced icons 210 available only through their service. A content provider also has the option of putting a new or different enhanced icon 210 into the enhanced icon toolbar of all or some of their messaging service users, based on certain criteria such as demographic or historic data available about a user through the user's interaction with the service, for example.

Furthermore, enhanced icons 210 can be used to provide additional advertising value through content specific information 214 that is, in one non-limiting embodiment of the invention, included as part of the rich media 210. Content specific information 214 preferably comprises a short title of the enhanced icon 210, a caption that describes the enhanced icon 210 and/or a caption that is a transcription of what the enhanced icon 210 says, an enhanced icon identifier (ID) or identifiers, and a context menu array including menu items that are specific to the user perceptible content 212 of the enhanced icon 210. For example an enhanced icon 210 representing a movie character can include a context menu item that is a link to the movie's Website.

Some messaging service providers offer a messaging program function that loads user perceptible content, such as for example, graphics and interactive programs, into the messaging program interface to enhance the messaging environment. For example, a winter themed environment can change the history window to include animated falling snowflakes. In addition, messaging service users in a messaging session with the winter environment loaded can work together to build a snowman. These environments 217 can also be directed to a marketing partner's content, for example a movie, and thereby be used by a content provider as an advertising platform. A marketing partner can also have enhanced icons 210 that are related to the same movie. In some embodiments there may be extra or bonus features when related enhanced icons 210 and environments 217 are used at the same time. Preferably, any enhanced icon 210 can be used with any loaded environment 217.

As mentioned above, content specific information 214 preferably includes a context menu array including menu items that are specific to the user perceptible content 212 of the enhanced icon 210, for example, a context menu item that is a link to a movie's Website. Additionally, an enhanced icon's 210 context menu can include a command to load a related environment 217. Therefore if a messaging service user is interested in a product represented by an enhanced icon 210, and the product owner also has a related environment 217, the messaging service user can easily load the related environment 217 through the context menu of the enhanced icon 210. The messaging program 274 may also offer tabs that are dedicated and/or related to the product. A context menu can include commands to load these dedicated and/or related tabs. Enhanced icons 210, therefore, become a new and potentially powerful tool for publicizing a product or service and for directing customers to other network and other messaging service content that is related to a product or service.

User side module 274 also includes a coupling module 205. Network communication medium coupling module 205 may be implemented as computer code, such as, for example, a Java and/or JavaScript Application Programming Interface (API) 205, and facilitates communication between the user side module 274 and the rich media 210. When a messaging service user selects an enhanced icon 210, for example by clicking on it, a context menu (described further below) is displayed by the messaging program. Some or all of the context menu items may be obtained from the context menu array that is part of the content specific information 214. The communication of the context menu array from the enhanced icon 210 to the messaging program is facilitated through the coupling module 205. Additionally, the messaging program 274 can populate a context menu with different menu items depending on the location of the enhanced icon 210 within the messaging program 274. Therefore the coupling module 205 determines the location of the enhanced icon 210 and populates the context menu with the desired items.

Furthermore, the coupling module 205 allows the messaging program 274 to control different aspects of the display of the enhanced icons 210. Messenger service users can set their enhanced icon display preferences and store their preferences with a messaging service provider so that their unique enhanced icon experience is available to them anywhere they have network access. Exemplary enhanced icon preferences include the enhanced icon interface state (hidden/displayed), enable/disable enhanced icons, mute enhanced icons, and display enhanced icon caption proximate to enhanced icon. In an exemplary embodiment of the invention, some of the user preferences, including enable/disable enhanced icons and mute enhanced icons require communication between the messaging program 274 and the enhanced icons 210. This communication is facilitated by the coupling module 205.

When enhanced icons 210 are disabled, the enhanced icon caption is preferably displayed in place of the enhanced icon 210. The messaging program 274 retrieves the enhanced icon caption from the content specific information 214 of an enhanced icon 210 through the coupling module 205 for display. When enhanced icons 210 are muted, the messaging program 274 tells the enhanced icon 210 to play without sound. In accordance with an embodiment of the invention, the messaging program 274 also displays the enhanced icon caption when enhanced icons 210 are muted.

Other aspects of the display of the enhanced icons 210 can be set by the messaging service. For example the number of enhanced icons 210 that are played at any given time can be limited to one. If a messaging service user sends or receives an enhanced icon 210 while another enhanced icon 210 is playing, the messaging program 274, through the coupling module 205, can stop the playing of other enhanced icons 210 and play the newly sent or received enhanced icon 210. Since enhanced icons 210 can incorporate sounds and animation, it is preferable to limit the number of enhanced icons 210 that can play at any one time. Other functions such as checking whether the newly sent or received enhanced icon 210 includes sound before stopping any other enhanced icon 210 is also available to the messaging service. In a non-limiting example, when enhanced icons 210 are implemented as a SWF, an internal flash communication channel can be used to signal other enhanced icons 210 to stop playing.

Tracking module 216 can track the usage of enhanced icons 210. The usage information can be used by the content provider for many purposes, such as, for example, to set advertisement payment structures and/or to measure the popularity of their service. Preferably, the messaging program can track at least the following information: the number of unique users per day, week, and month who sent or received any enhanced icon; the number of unique users per day, week, and month who sent or received a particular enhanced icon; the average and the total number per day, week, and month of messages sent containing a particular enhanced icon; the average and the total number per day, week, and month of messages sent containing any enhanced icon; the average and the total number of messages sent from a high-tiered messaging service user, for example a messaging service user who pays for extra services, to another high-tiered messaging service user; the average and the total number of messages sent from a high-tiered messaging service user to a regular, for example, free, messaging service user and the number of times a user selects a content specific menu item and links to content related to the user perceptible content of the enhanced icon. Other data gathered using the teachings herein is a matter of application specific design choice, as is the use to which such data may be put. Statistical information gathered by the messaging program 274 can preferably be transmitted periodically to the content provider. In an alternate embodiment, statistical tracking may be gathered at a messaging service server operated by the content provider.

While coupling module 205, tracking module 216, environments 217 and rich media 210 are illustrated in FIG. 2 as being part of user side module 274, and user perceptible content 212 and content specific information 214 are illustrated as part of rich media 210, in alternate embodiments, coupling module 205, tracking module 216, environments 217, enhanced media 210, user perceptible content 212, content specific information 214 and enhanced media usage tracking module 216 can be separate components stored on the data storage device 252, or they can be located at a remote location and accessed by the user side module 274 through communication interface 268. In addition, while the modules 254, 256, 258, 262, 260, 266, 268, 264, 252 of the computer 130' are illustrated as separate components in alternate embodiments some or all of the modules 254, 256, 258, 262, 260, 266, 268, 264, 252 can be combined as one module.

The computer 130' may communicatively connect to the Internet 105 via the communication interface 268 over one or more transmission media including, but not limited to, coaxial cable, copper wires, and fiber optical cables. Communication between the computer 130' and the Internet 105 may also be via a wireless medium, such as, for example, a wi-fi or cellular interface. The communication interface 268 facilitates two-way communication between the computer 130' and another electronic device or system, for example, a server computer or computers 140, 145, 150, 155 provided by a content provider 120, 125.

In alternative embodiments, computer 130' may be a desktop or notebook computer, personal digital assistant (PDA), hand held device, or wireless phone (with graphics capability), or any other device using any communication methodology now known or hereafter developed that is capable of performing the functions as described herein.

User two 135 also includes a user and a network communication medium. The network communication medium can also be a computer and may be similar to the computer 130' of FIG. 2.

Figure 3:
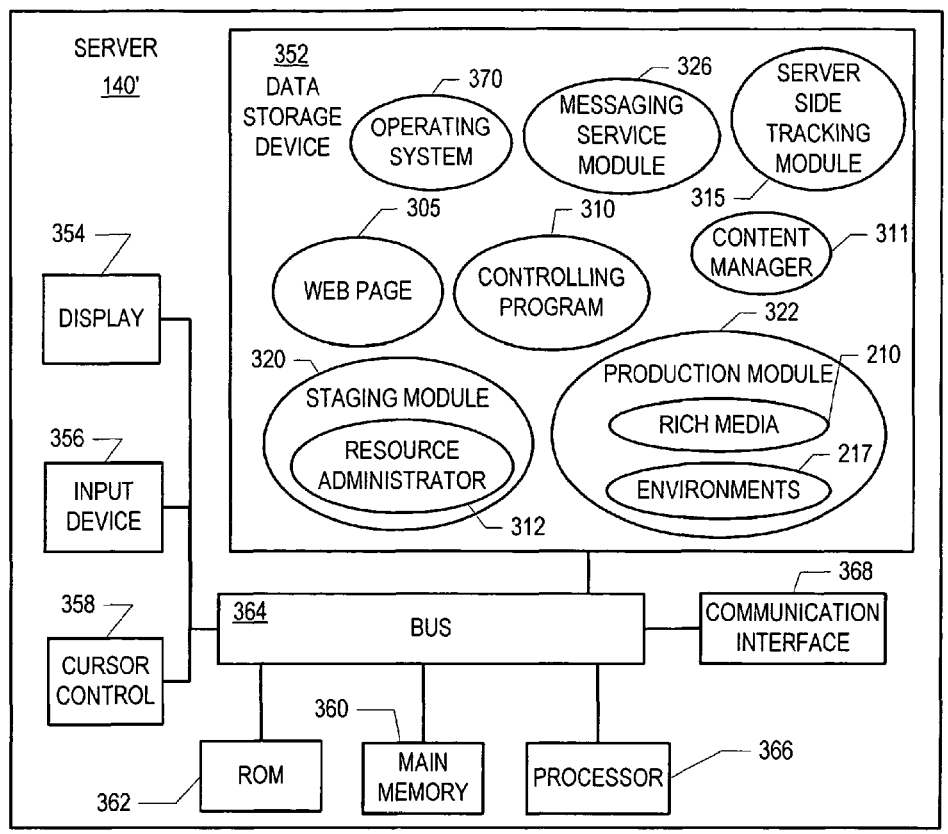
FIG. 3 is a schematic illustrating an exemplary server implemented according to an embodiment of the invention.

FIG. 3 illustrates an exemplary embodiment of server 140' that may be implemented as any of the servers one through four 130, 145, 150, 155 of system 100. Server 140' comprises a display 354, an input device 356, a cursor control 358, ROM 362, main memory 360, a processor 366, and a communication interface 368, coupled together by bus 364. In alternate embodiments the server 140' does not include the display 354, the input device 356 and the cursor control 358.

The server 140' also includes a data storage device 352, which is coupled to the bus 364. The data storage device 352 includes an operating system 370, a web page 305, a controlling program 310, a content manager 311, a server side tracking module 315, a messaging service module 326, a staging module 320 and a production module 322. Staging module 320 includes resource administrator 312, and production module 322 includes rich media 210 and environments 217.

In accordance with an embodiment of the invention, an Internet user can obtain the user side module 274, which is, for example, implemented as a messaging program 274, by using their browser 272 to navigate to the Webpage 305 hosted at the server 140'. The webpage 305 may contain information about the messaging program 274 and links for downloading the messaging program 274 for installation on the user's computer. In addition, the Webpage 305 may give users access to a controlling program 310 for controlling the browser 272 to download and install the messaging program 274. Messaging service usage tracking the made and stored by server side tracking module 315.

Messaging service operations and data are controlled and stored by messaging service module 326. Users of the messaging service maintain user accounts with the content provider. User accounts are used to identify users on the Internet and to store user preferences. Messaging service users use their messaging programs to log-in to the messaging service in order to use the service and retrieve their preferences. The content manager 311 manages the messaging service data. In an embodiment of the invention, after a messaging service user logs-in to the messaging service, the content provider sends a content manager feed to the messaging service user comprising the user's preferences and other messaging service settings. Messaging service module 326 controls the log-in functions and other functions of the messaging service such as, for example, receiving and forwarding messages from messaging service users.

Staging module 320 of FIG. 3, allows the content provider to verify and store data about enhanced icons 210. In accordance with an embodiment of the invention, data about the enhanced icon 210 including how they appear in the messaging program is stored by staging module 320. A resource administrator 312, which may be implemented as a human operator of a program or a fully automated program, facilitates the managing and verification of enhanced icons 210.

In addition, enhanced icons 210 may be assigned an enhanced icon ID using the staging module 320. Enhanced icon IDs are used to organize and store the enhanced icons 210. Messages sent through the messaging service include an enhance icon ID rather than the enhanced icon 210 itself to save bandwidth. The enhanced icon 210 associated with the enhanced icon ID can then be obtained by the messaging program 274 from a server through production module 322 and cached locally. After an enhanced icon 210 is validated and prepared using the staging module 320, the enhanced icon 210 is made available to messaging service users through production module 322. In an embodiment, enhanced icons 210 are hosted on a production server including production module 322.

While exemplary server 140' includes a plurality of software modules 305, 310, 311, 312, 315, 210, 217, 326, 320, 322, as separate software components, in alternate embodiments, one or more of the modules 305, 310, 311, 312, 315, 210, 217, 326, 320, 322, may be combined and/or separated to perform the functions of the combined and/or separated modules. Additionally, while exemplary server 140' includes a plurality of modules 305, 310, 311, 312, 315, 210, 217, 326, 320, 322, in alternate embodiments the modules 305, 310, 312, 315, 210, 217, 326, 320, 322 may be dispersed into separate servers in separate or similar locations. This si true for all software modules described herein. For example in system 100 of FIG. 1, server one 140 may be implemented to act primarily as a messaging service server and include webpage 305, controlling program 310, content manager 311, server side tracking module 315 and messaging service module 326, server two 145 may be implemented as a staging server and include staging module 320, server three 150 may be implemented as a rich media server and include production module 322 with rich media 210 and server four 155 may be implemented as an environments server and include production module 322 with environments 217.

Figure 4:
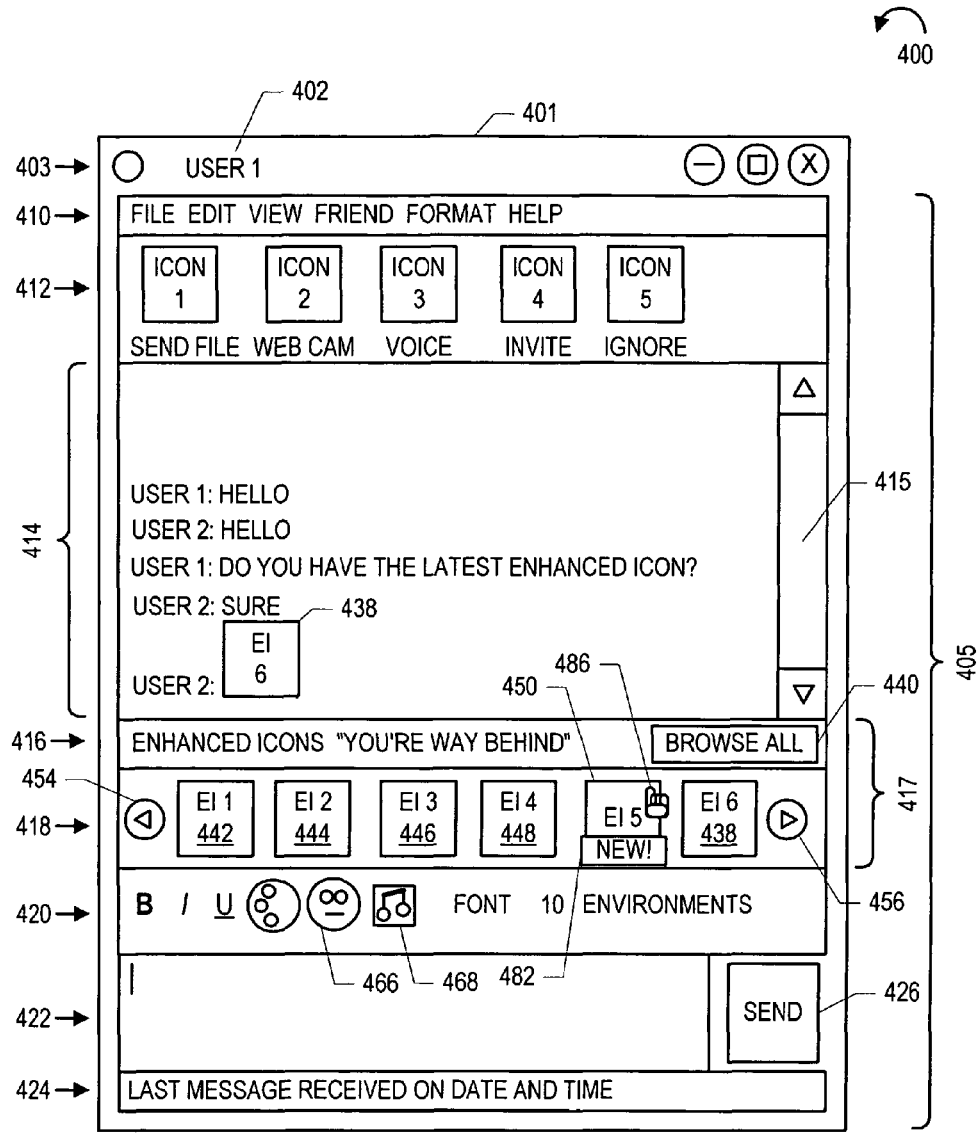
FIG. 4 is an exemplary diagram of an instant message (IM) graphical user interface (GUI) implemented according to an embodiment of the invention.

A first messaging service user, user one, can initiate an instant message session with a second messaging service user, user two, by opening an instant messaging (IM) graphical user interface (GUI) associated with user two and sending a message to user two through a messaging service server. User two's messaging program receives the message and opens an IM GUI to display the message. FIG. 4 illustrates an exemplary diagram of an IM GUI 400 that is displayed on user two's computer. The IM GUI displayed on user one's computer is similar, but is displayed with user one's enhanced icon 210 preferences. The terms used to describe the parts of IM GUI 400 are not limited to an IM messaging program. In alternate embodiments of the messaging program 274, such as, for example, a chat room messaging program 274 may use the same terms and parts as IM GUI 400. The IM GUI 400 is displayed in an application window 401. Application window 401 comprises a window bar 403 and a display area 405 to display an application, such as, for example, an IM GUI 400.

In this exemplary embodiment, the title 402 of the application window 401 is "user 1" because user two is participating in an instant messaging session with user one and IM GUI 400 is associated with user one. A menu bar 410 is displayed under the window bar 403 and includes one or more menu categories, including file, edit, view, friend, format and help. Below the menu bar 410 is the IM GUI toolbar 412. IM GUI toolbar 412 is comprised of buttons which, include an icon and a button title, and when selected by a messaging service user, perform commonly used functions.

Under the IM GUI toolbar 412 is the IM GUI history window 414. The history window 414 includes a record of an instant message session between messaging program users. The history window 414 displayed at user one and user two's computers are the substantially similar. The term history window 414 is not limited to IM messaging applications. In alternate embodiments, where the messaging program facilitates another type of Internet messaging, such as, for example a chat room, a history window 414 also displays a record of the chat room conversation. In the exemplary conversation of FIG. 4, user two has sent enhanced icon six 438 to user one. Enhanced icon six 438 is displayed in the history window 414 and is played at both user one and user two's IM GUI. History window 414 also includes a scroll bar 415 that allows the messaging service user to view parts of the session that have been pushed out of the history window 414 due to the length of the session.

Below the history window 414 is the enhanced icon interface 417 which includes an enhanced icon caption area 416 and an enhanced icon toolbar 418. When a user places a mouse pointer over an enhanced icon 210, the mouse pointer changes into a hand pointer, signaling to the user that there are click actions available, and the words spoken by the enhanced icon 210 or a description of the enhanced icon 210 is displayed in the enhanced icon caption area 416. For example, in FIG. 4 a mouse pointer 486 is placed over enhanced icon five 450, and is therefore a hand pointer. The enhanced icon caption area 416 displays what enhanced icon five 450 would play if selected by a user. For example, enhanced icon five 450 says "You're way behind." The enhanced icon caption is obtained from the content specific information 214 of enhanced icon five 450 through coupling module 205. In addition, a ToolTip (not shown) stating, "Click once to preview this enhanced icon. Double-click to send this enhanced icon. Right-click to see more options for this enhanced icon." may be displayed. A ToolTip is a descriptive text box that appears when a mouse pointer is held over a tool, button or other object.

Enhanced icon caption area 416 also includes a "browse all" button 440. Selecting the "browse all" button 440 displays a second application window including an enhanced icon dialog that allows the user to manipulate their enhanced icon toolbar 418. The enhanced icon dialog is described later in the application.

Below the enhanced icon caption area 416 is the enhanced icon toolbar 418. The enhanced icon toolbar 418 allows a messing service user to quickly preview and send their enhanced icons 210 to other users. For example, in FIG. 4 the enhanced icon toolbar 418 comprises enhanced icons one through six, 442, 444, 446, 448, 450, 438. The enhanced icon toolbar 418, in this exemplary embodiment, can show a maximum of six enhanced icons 210. Any additional enhanced icons 210 in the enhanced icon toolbar 418 may be viewed by pressing the scroll buttons 454 and 456. A messaging service user can customize the enhanced icon toolbar 418 by adding new enhanced icons 210, reordering enhanced icons 210, and/or removing enhanced icons 210, for example by using an enhanced icon dialog that is described later. The order of a messaging service user's enhanced icons 210 and which enhanced icons 210 the user added to their enhanced icon toolbar 418 is stored on a content provider server so that when the user logs in on different machines, the same enhanced messaging experience is available to the user.

When a messaging service user selects, in a first manner, for example single clicks, an enhanced icon 210 from the enhanced icon toolbar 418, a preview of the enhanced icon 210 is played in the enhanced icon toolbar 418. The enhanced icon 210 plays its user perceptible content 212, for example the enhanced icon 210 plays a short animation accompanied by audio. In an embodiment of the invention the preview begins after a 1 second delay so as not to confuse a single click with a double-click. In alternate embodiments the preview can begin immediately after the user single clicks an enhanced icon 210.

When a messaging service user selects, in a second manner, for example double clicks, an enhanced icon 210 from the enhanced icon toolbar 418, the selected enhanced icon 210 is sent to the messaging service user associated with the IM GUI. Enhanced icons 210 are sent after they are selected from the enhanced icon toolbar 418 as opposed to being placed in a message compose field 422, in order to control the number of enhanced icons 210 that can be sent in one message to prevent enhanced icon flooding. In alternate embodiments the enhanced icon 210 is placed in a message compose field 422, and the messaging service user is allowed to add extra text and/or additional enhanced icons 210 to their message. In addition, alternate anti-flooding techniques may be implemented, such as, for example, only playing a first enhanced icon 210 and/or by controlling the number of enhanced icons 210 a user can send in a given time period.

When a messaging service user selects in a third manner, for example, by left or right clicking an enhanced icon 210 from the enhanced icon toolbar 418, a first context menu (not shown) is displayed. An exemplary context menu for an enhanced icon 210 located in the enhanced icon toolbar 418 is described later with reference to an alternate embodiment of the IM GUI. The first context menu of the IM GUI 400 is similar to the later described context menu. In accordance with the invention, different context menus are displayed depending on the location of the enhanced icon 210 within the messaging program 274. The context menu for an enhanced icon located in the enhanced icon toolbar 418 can include the following menu items: "Preview this Enhanced Icon", "Send this Enhanced Icon", one or more content specific enhanced icon menu items that are stored in the enhanced icon 210 and is described in greater detail below, and "Find Similar Enhanced Icons." The context menu array is included as part of the content specific information 214 of an enhanced icon 210. In addition, the content specific information 214 is obtained from the enhanced icon 210 through coupling module 205 for display in the context menu.

Selecting "Preview this Enhanced Icon" is the same as left-clicking an enhanced icon 210 once to play the enhanced icon 210 in the enhanced icon toolbar 418, selecting "Send this Enhanced Icon" is the same as double-clicking the enhanced icon 210 and selecting "Find Similar Enhanced Icons" opens the enhanced icon dialog to the same set and category as the selected enhanced icon 210 to find other enhanced icon 210 in the same set. The enhanced icon dialog, enhanced icon sets and categories is described in further detail below.

The content provider or IM program provider or authorized other party can manage the presence, absence organization or capabilities of an enhanced icon 210. For example, invalid enhanced icons 210 in the enhanced icon toolbar 418 are preferably automatically removed. Invalid enhanced icons 210 can include old enhanced icons 210 that a content provider no longer wants to support, enhanced icons 210 with corrupted IDs and enhanced icons 210 that are not approved by a content provider because, for example they do not meet the content provider's specification or they were introduced by an unauthorized party. Information about invalid enhanced icons 210 can be sent to messaging service users in a content manager feed, from content manager 311.

Enhanced icon five 450 includes a "NEW" banner 482. In accordance with the invention a content provider can periodically add new enhanced icons 210 to a messaging service user's enhanced icon toolbar 418, for example through a content manager feed. A new enhanced icon 210 could then, if desired, appear with a "NEW" indicator over it, or as a ToolTip, that disappears after a user interacts with the enhanced icon 210, for example, by previewing or sending the enhanced icon 210. The new enhanced icon 210 is automatically inserted into the enhanced icon toolbar 418 so that it is visible in the enhanced icon toolbar 418 and retains that position until the messaging service user modifies their enhanced icon toolbar 418.

Below the enhanced icon interface 417 is a messaging toolbar 420. Messaging toolbar 420 includes buttons to manipulate the message text. Messaging toolbar 420 also includes buttons to enable or disable additional functions of the messaging program 274. For example, emoticon button 466 enables or disables emoticons, and enhanced icon button 468 hides or displays the enhanced icon interface 417. When a messaging service user closes the IM GUI 400, the state of the enhanced icon interface 417 (i.e., hidden or displayed) is recorded so that the next time the IM GUI is opened, the messaging program 274 can restore the enhanced icon interface 417 to the last used state. In addition, a messaging service user can disable enhanced icons 210 in the messaging program preferences so that they only see enhanced icon captions. In an embodiment of the invention, if a messaging program user disables enhanced icons and subsequently receives an enhanced icon 210, only the enhanced icon caption is displayed. When enhanced icons 210 are disabled the user, in one non-limiting embodiment, cannot display the enhanced icon interface 417. Therefore, if a user selects enhanced icon button 468 while enhanced icons are disabled, the messaging program 274 asks the user if they want to enable enhanced icons 210.

Below the messaging toolbar 420 is a message compose field 422. Message compose field 422 is where a messaging service user composes the message that they will send to the messaging service user associated with the IM GUI 400. The messaging service user can send a completed message by pressing the send button 426.

Finally, under the message compose field 422 is the messaging program status bar 424. The status bar 424 tells the messaging service user the status of the messaging program 274. For example, in FIG. 4 the status bar 424 informs the user of the date and time of the last received message.

In accordance with an embodiment of the invention, different context menu items are be displayed in a context menu depending on the location of the enhanced icon 210 in the messaging program 274. A JavaScript API 205 is described as exemplary coupling module 205, (FIG. 2), that communicates between the messaging program 274 and the enhanced icons 210 to access content specific information 214, and so that the messaging program 274 knows when an enhanced icon 210 has been selected and where the enhanced icon 210 is located when it was selected so that the proper context menu items are displayed according to the location of the enhanced icon 210, using content specific information 214.

Figure 5:
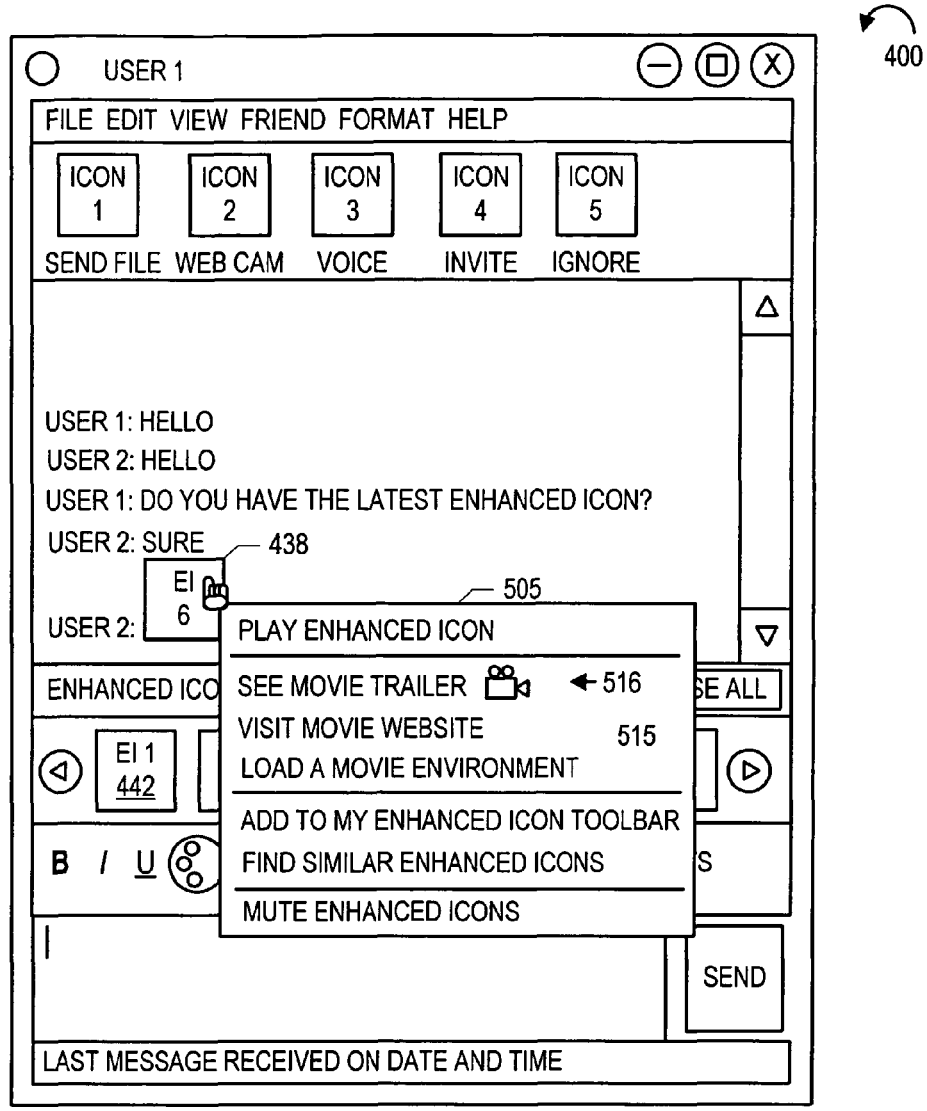
FIG. 5 is an exemplary context menu implemented according to an embodiment of the invention.

FIG. 5 illustrates an exemplary context menu 505 that is displayed when a user selects, for example, right clicks or left clicks, enhanced icon six 438 located in the history window 414. Context menu 505 includes several menu items including "Play Enhanced Icon", "See Movie Trailer", "Visit Movie Website", "Load A Movie Environment", "Add to my Enhanced Icon Toolbar", "Find Similar Enhanced Icons" and "Mute Enhanced Icons". Selecting "Play Enhanced Icon" replays enhanced icon six 438. If a user has muted enhanced icons 210, selecting "Play Enhanced Icon" causes the messaging program 274 to turn audio on and to play enhanced icon six 438 with sound. In alternate embodiments, the messaging program 274 asks the user if they want to turn the audio on before playing an enhanced icon 210.

The next three context menu items 515 are content specific enhanced icon menu items. These menu items include information that is specific to the user perceptible content 212 of the enhanced icon 210. In accordance with an embodiment of the invention, the content specific information 214 in the exemplary form of menu items is stored in the enhanced icon 210 as, for example, an array of menu items. In alternate embodiments the menu items may be obtained from a remote location over the computer network 105. If enhanced icon six 438 was a character in a movie, the content specific enhanced icon menu items can comprise a link to the movie's trailer, a link to the movie's Website and a menu item that loads an environment that is related to the movie. Each menu item in the array is comprised of a display string; a URI, Environment ID or Messaging program Tab ID; and a command. Some of the commands are comprised of opening a browser to a URI, loading a specific environment and adding and/or showing a messaging program 274 Tab.

In this way, enhanced icons 210 become an effective means for advertising. Using enhanced icons 210, a marketing partner can spread their user perceptible content 214 in a viral like manner to users of the messaging program 274, and through the content specific context menu items, the marketing partner can link the messaging program users to additional Internet media, such as for example videos and Web pages, related to their products.

Returning to the description of context menu 505 if a user selects "Add to my Enhanced Icon Toolbar" the enhanced icon six 438 is added to the user's enhanced toolbar 418. In accordance with an embodiment of the invention, selecting "Add to my Enhanced Icon Toolbar" adds enhanced icon six 438 to the front of the enhanced icon toolbar 418. If enhanced icon six 438 is already in the enhanced icon toolbar 418, the enhanced icon 438 is moved to the front of the enhanced icon toolbar 418. If the enhanced icon toolbar 418 is hidden, selecting "Add to my Enhanced Icon Toolbar" displays the enhanced icon toolbar 418 and adds the selected enhanced icon 210.

Selecting "Find Similar Enhanced Icons" brings up an enhanced icon dialog to the same set and category as the selected enhanced icon 210 to find other enhanced icons 210 in the same set. The enhanced icon dialog, enhanced icon categories and set are described in further detail later in the application. In an alternate embodiment, a "Show more movie enhanced icons" menu item (not shown) may be displayed in place or in addition to the "Find Similar Enhanced Icons" menu item. Selecting the "Show more movie enhanced icons" loads the entire movie enhanced icon set into the enhanced icon toolbar 418.

Figure 6:
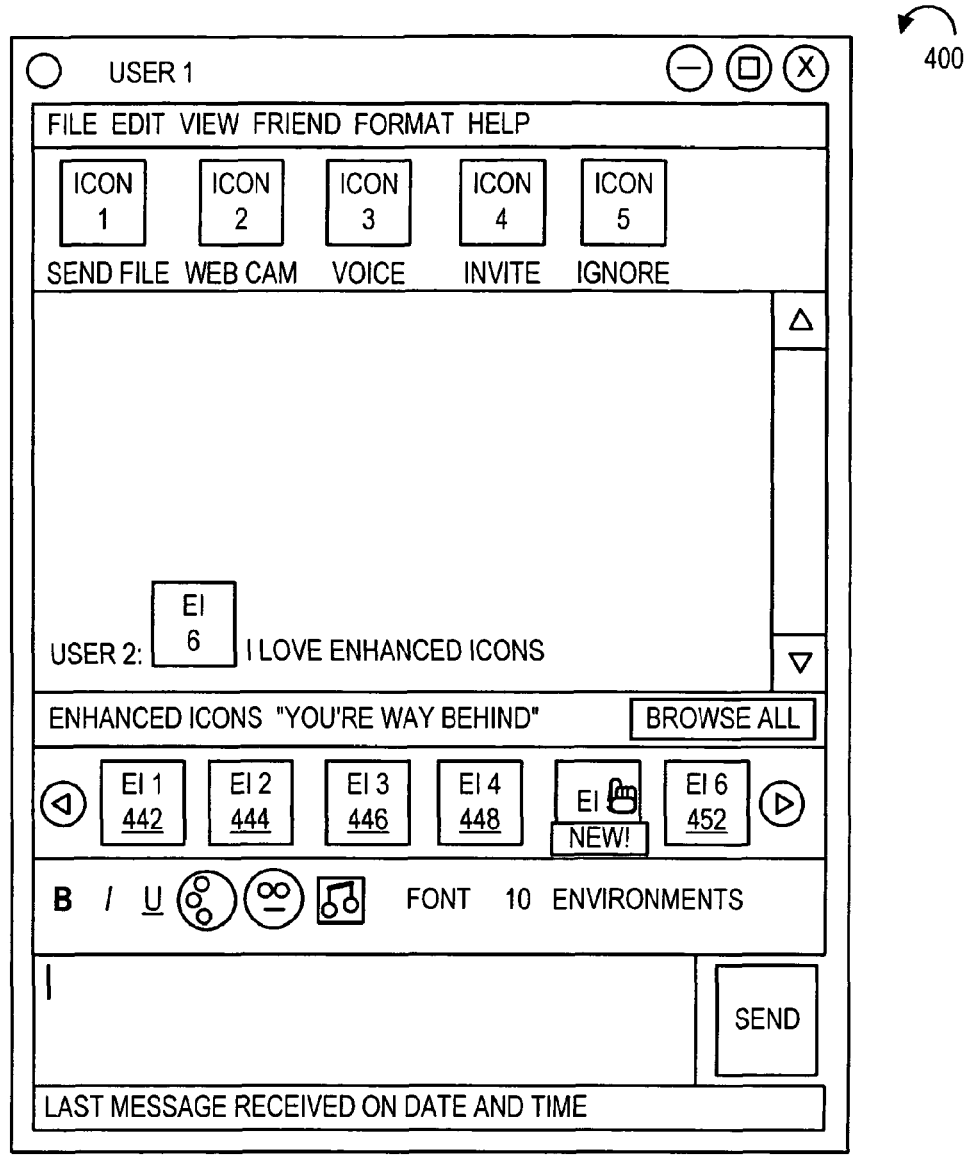
FIG. 6 is an exemplary IM GUI displaying an enhanced icon while enhanced icons are muted according to an embodiment of the invention.

Selecting "Mute Enhanced Icons" mutes all enhanced icons 210 at the user's IM GUI 400. In alternate embodiments checking the mute enhanced icons menu item only mutes the enhanced icon 210 that is currently selected. Un-selecting the "Mute Enhanced Icons" menu item restores sound to the enhanced icons 210. FIG. 6 illustrates the IM GUI 400 displaying an enhanced icon six 438 while enhanced icons 210 are muted. Enhanced icon six 438 still animates, but no sound is played. In addition, the transcription of the words spoken by enhanced icon six 438, in this example, "I Love Enhanced Icons", is obtained from the content specific information 214 of enhanced icon six 438 through coupling module 205 and displayed proximate to the enhanced icon six 438. Furthermore, the user of the messaging program can set their preferences so that the caption is not displayed while enhanced icons 210 are in the muted state, and so that the caption is displayed while enhanced icon audio is turned on.

Figure 7:
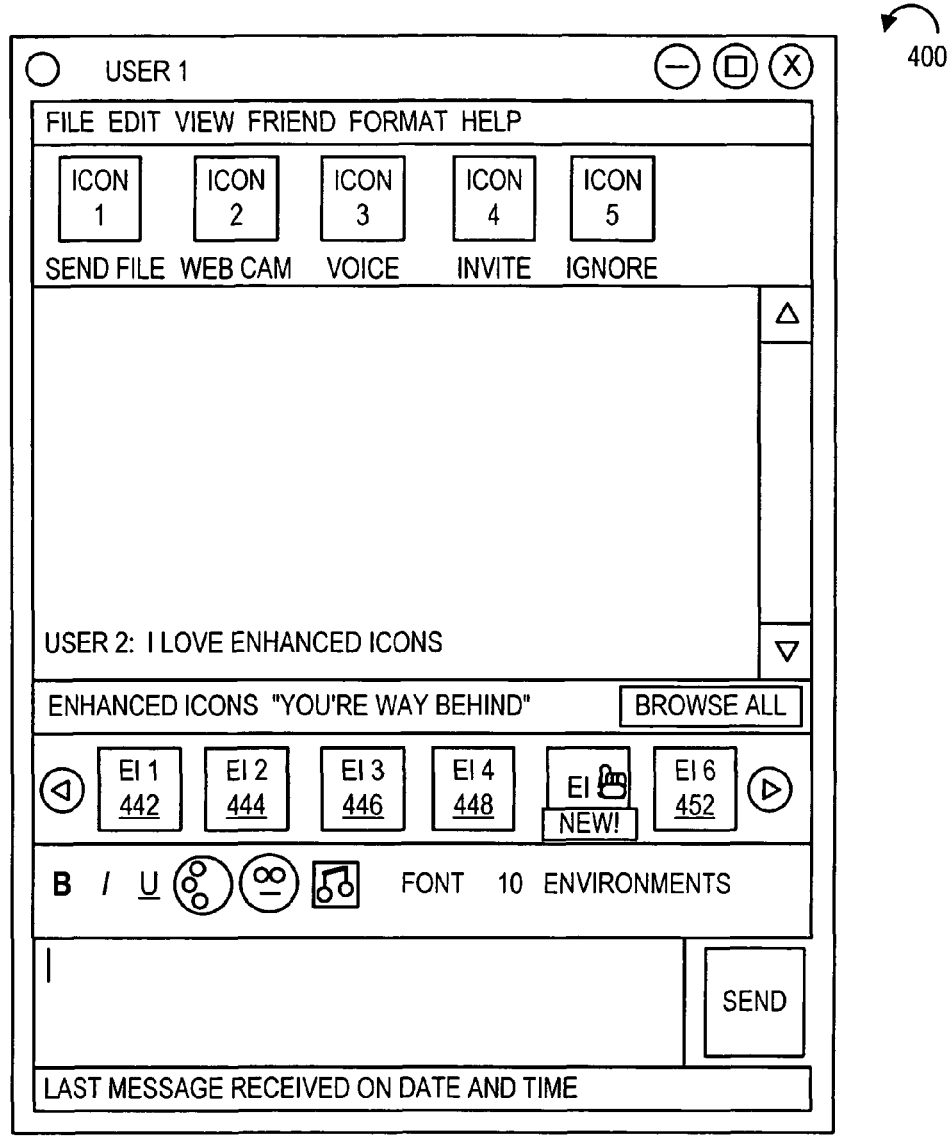
FIG. 7 is an exemplary IM GUI displaying an enhanced icon with enhanced icons disabled according to an embodiment of the invention.

In accordance with the invention, a messaging service user can disable enhanced icons 210 as part of their messaging program preferences. FIG. 7 illustrates the IM GUI 400 displaying enhanced icon six 438 with enhanced icons 210 disabled. In this example, enhanced icon six 438 is not shown or heard. The enhanced icon caption, i.e., the description of the enhanced icon or a transcription of the words spoken by the enhanced icon, is obtained from the content specific information 214 of enhanced icon six 438 through coupling module 205 and displayed proximate to the user name. In addition, if a messaging service user is using a messaging program 274 that is not compatible with enhanced icons 210, in an embodiment of the invention, the description of the enhanced icon 210 or a transcription of the words spoken by the enhanced icon 210 is displayed in place of the enhanced icon 210 as shown in FIG. 7.

In an alternate embodiment of context menu 505, one or more of the content specific context menu items 515 may be a media item. The media item may be, for example an advertisement, a picture, a video, an enhanced icon, text, etc. The media item may also comprise any combination of media items, for example context menu item 516 comprises text and an image. The media item can be stored at a server and retrieved by the messaging program 274 when the context menu 505 is called. In alternate embodiments the media item may be part of the content specific information 214 of the enhanced icon 210, and accessed by the messaging program 274 via the coupling module 205. In addition, context menu items may be comprised of one or more portions, each portion being comprised of any combination of media items. Different portions of a context menu item may be stored on a server and/or be included as part of the content specific information 214 of the enhanced icon 210. When a context menu 505 is called, the messaging program 274 retrieves the different portions of the context menu items from their appropriate locations. Standard content menu items may also be divided into portion and implemented as media items.

The enhanced icon dialog allows messaging service users to browse through a selection of enhanced icons 210 and manage the appearance of the enhanced icons 210 in their enhanced icon toolbar 418. In accordance with an embodiment of the invention, enhanced icons 210 are grouped in sets of at least one. Each set has a theme, such as, for example, characters saying lines from a movie. In some embodiments, each enhanced icon 210 in a set is visually unique, so that a user can visually discern different enhanced icons 210 without playing them. Sets are placed in Categories like Movies, Expressions, Games, etc. Therefore a movie category may include enhanced icon sets of movie one-liners and soundtrack samples, while an expressions category may include enhanced icon sets of flirts, insults, hellos and goodbyes and a games category includes enhanced icon sets of taunts, wins, loses and invites. Enhanced icons 210 are not restricted to a single set. Some enhanced icons may appear in two different sets.

Figure 8:
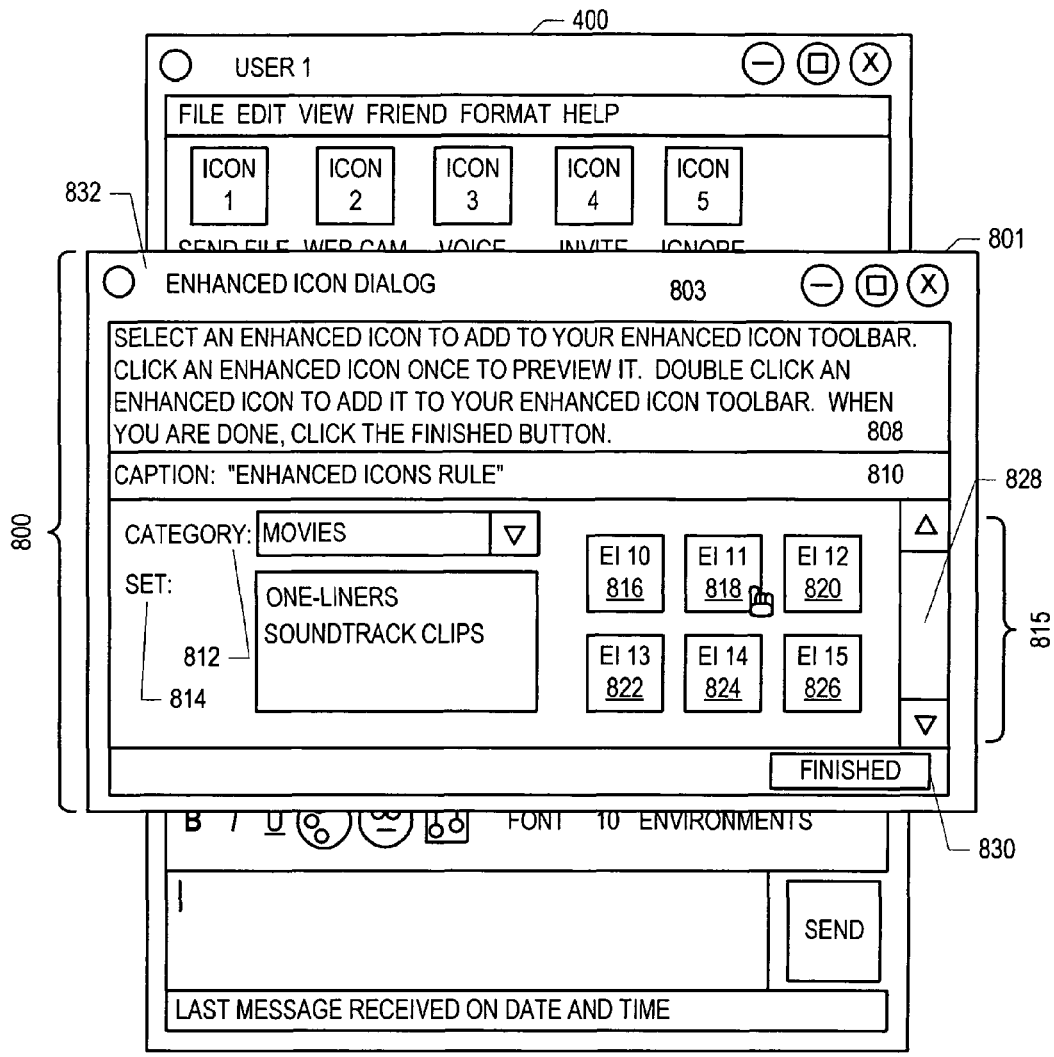
FIG. 8 is an exemplary enhanced icon dialog implemented according to an embodiment of the invention.

FIG. 8 illustrates an exemplary enhanced icon dialog 800. An enhanced icon dialog is displayed in a second application window 801. Second application window 801 includes a window bar 803, which includes a window title 832. In this example the title of the window 801 is "Enhanced Icon Dialog".

Enhanced icon dialog 800 includes an instruction field 808, a caption area 810, a category selector 812, a set selector 814, an enhanced icon in a set display area 815 and, an enhanced icon toolbar preview (not shown). The instruction field 808 gives a messaging service user a description of how to use the enhanced icon dialog 800. Below the instruction field 808 is an enhanced icon caption area 810. When a user places a mouse pointer over an enhanced icon 210 displayed in the enhanced icon dialog 800 a description of the enhanced icon 210 or a transcription of the words spoken by the enhanced icon 210 is previewed in the caption area 810.

Below the caption area 810 are displayed the category selector 812, the set selector 814 and the enhanced icon in a set display area 815. A selection of enhanced icons 210, enhanced icon ten through fifteen, 816, 818, 820, 822, 824, 826, that a user may choose to add to their enhanced icon toolbar 418 is displayed in the enhanced icon in a set display area 815. If more than six enhanced icons 210 are in a set, the enhanced icon in a set display area 815 can be scrolled using scroll bar 828. In alternate embodiments the enhanced icons 210 can be scaled to fit the display area 815. In the example of FIG. 8 the enhanced icon dialog 800 is currently displaying the "Movie" category. A user can change the category by selecting the drop down menu button 811 in the category selector 812. When a user selects drop down menu button 811 a drop down menu appears including additional categories. The categories may include music, expressions, games, etc. Each category includes one or more sets. The available enhanced icon categories and sets may be sent to the messaging program 274 in a feed from the content manager 311 when the enhanced icon dialog is displayed.

In the example of FIG. 8, the "Movie" category has two sets, one-liners and soundtrack clips. Each set includes at least one related enhanced icon 210. For example, in FIG. 8 the enhanced icons, enhanced icon ten through fifteen, 816, 818, 820, 822, 824, 826, are characters speaking a line from a movie. In alternate embodiments, there may be a minimum of six enhanced icons 210 per set and no maximum. A user can preview the enhanced icons 210, for example, by clicking on them once, and the user may add an enhanced icon 210 to their enhanced icon toolbar 418 by, for example, double clicking on a desired enhanced icon 210.

Although not shown in FIG. 8, a copy of the user's enhanced icon toolbar 418 is displayed in the enhanced icon dialog 800. The user can manipulate this copy of the enhanced icon toolbar 418 by, for example, adding, reordering or removing enhanced icons 210. This may be implemented using a drag and drop technique and/or by buttons for adding, removing, moving an enhanced icon 210 up the list and moving an enhanced icon 210 down the list. Adding an enhanced icon 210 to the enhanced icon toolbar 418 places the enhanced icon 210 at the front of the enhanced icon toolbar 418. If the enhanced icon 210 is already in the enhanced icon toolbar 418, then it is moved to the front of the enhanced icon toolbar 418.

When a user is finished updating their enhanced icon toolbar 418 they may select the finish button 830. Selecting the finish button 830 dismisses the enhanced icon dialog 800 and the enhanced icon toolbar 418 is updated with the changes. In addition, in accordance with an embodiment of the invention, when the messaging program 274 is used with a messaging service provided by an internet content provider, the change to the enhanced icon toolbar 418 are saved at a server. Saving the changes at a server allows a user of a messaging service to access their preferred settings at any computer.

Figure 9:
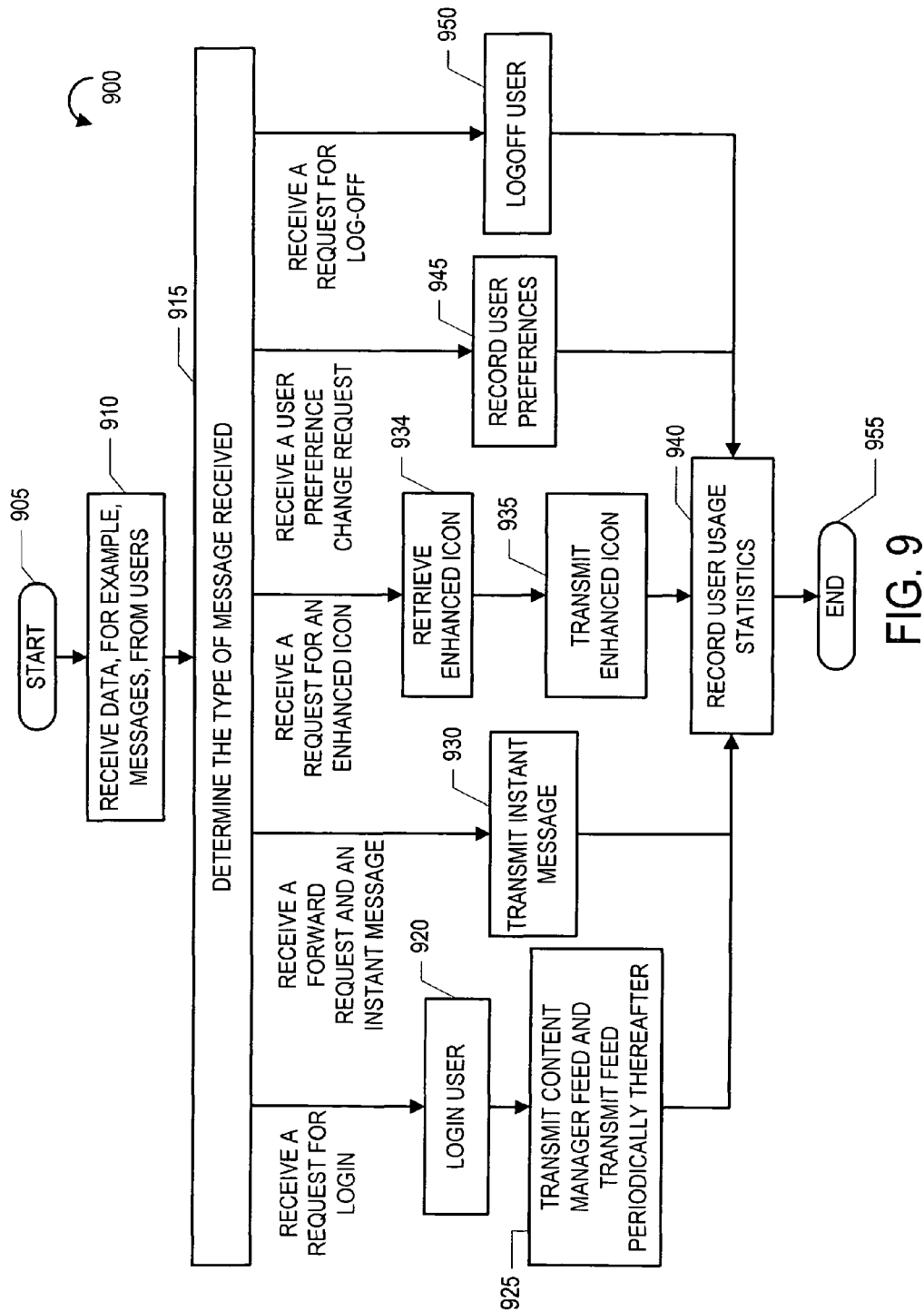
FIG. 9 is a flowchart illustrating an exemplary server side method of the invention.

FIG. 9 illustrates an exemplary server side method 900 that is described using server one 140, a messaging service server, and server three 150, a production server, of system 100 of FIG. 1. The order of the steps of method 900 and other methods of the invention illustrate a non-limiting exemplary embodiment of the order of the steps of the methods. In alternate embodiments the order of the steps may vary. The server side method 900 is part of an enhanced messaging service offered by an Internet content provider. Users of the messaging service obtain, for example by downloading, a user side module 274, implemented for purposes of the description of method 900 as a messaging program 274 from server one 140 and opening an account with the content provider. Method 900 starts in step 905, for example, with server one 140 monitoring for messages from the network 105. In step 910, server one 140 receives data from a network 105 user. Server one 140 can receive data from a plurality of different users and the data may comprise different types of messages. For example the message may be a request to log-in or log-off, a request to forward a message, a request for an enhanced icon and a request to change user preferences. Therefore, in step 915, server one 140 determines the type of message received.

Depending on the type of the message, server one 140 performs a different function. For example, if server one 140 receives a message including a "request for log-in", processing proceeds from step 915 to step 920 where server one 140, through messaging service module 326, logs in the user who sent the request. Then, in step 925, server one 140, via content manager 311, transmits a content manager feed to the user. The content manager feed includes data used by the messaging program 274, data such as, for example, preferences for different messaging program 274 functions. Following step 925, processing proceeds to step 940 where server one 140 records user statistics through tracking module 315. Then, processing proceeds from step 940 to step 955 where the method 900 ends, and server one 140 returns to monitoring for messages from network 105 users.

Returning to step 915, if server one 140 determines that the type of the message received is a "forward request and an instant message", processing proceeds from step 915 to step 930. In step 930, server one 140 transmits the received message to its intended recipient, via messaging service module 326. Following step 930, processing proceeds to step 940 where server one 140 records user statistics using server side tracking module 315. Then, processing proceeds from step 930 to step 955 where the method 900 ends, and server one 140 returns to monitoring for messages from network 105 users.

Returning to step 915, if server one 140 determines that the type of the message received is a "request for an enhanced icon", processing proceeds from step 915 to step 934. In an embodiment of the invention, the request for an enhanced icon comprises an enhanced icon identifier (ID). In step 934 server one 140, through messaging service module 326, uses the enhanced icon identifier to retrieve the desired enhanced icon 210, for example from production server four 155. Then, in step 935, server one 140, through messaging service module 326, transmits the enhanced icon 210 to the user who requested the enhanced icon 210. In an alternate embodiment server one 140 can transmit a network identifier, such as, for example a URI or a URL, associated with the enhanced icon 210 to the user who requested the enhanced icon 210. The user can then use the URI to retrieve the enhanced icon 210.

Following step 935, in step 940, the content provider tracks the usage of rich media 210, implemented for purposes of method 900 as enhanced icons 210, via server side tracking module 315. This tracking information can be used by the content provider to sell advertisements and to measure the popularity of their service. In addition, statistical tracking can also be performed by the messaging program 274, via tracking module 216. Statistical information gathered at the messaging program 274 can be transmitted periodically to the content provider. Following step 940, processing proceeds to step 955 where the method 900 ends, and server one 140 returns to monitoring for messages from network 105 users.

Returning to step 915 if server one 140 determines that the type of message received is a "user preference change request" processing proceeds from step 915 to step 945. In step 945, server one 140, through messaging service module 326, records the user preferences so they available to the user the next time the user signs on. User preferences are stored at server one 140 so that a messaging service user can obtain their preferences at any computer that has a connection to the content provider. When the user logs on to their account, the messaging program 274 receives the user's preferences in a content manager feed, and sets the messaging program's 274 parameters to meet the preferences. Following step 945, processing proceeds to step 940 where server one 140 records user statistics, through server side tracking module 315. Then, processing proceeds from step 940 to step 955 where the method 900 ends, and server one 140 returns to monitoring for messages from network 105 users.

Returning to step 915 if the server 140 determines that the type of message received is a "request for log-off", processing proceeds to step 950 where server one 140, through messaging service module 326, logs the user out of the messaging service. Following step 950, processing proceeds to step 940 where server one 140 records user statistics, through server side tracking module 315. Then, processing proceeds from step 940 to step 955 where the method 900 ends, and server one 140 returns to monitoring for messages from network 105 users.

Figure 10:
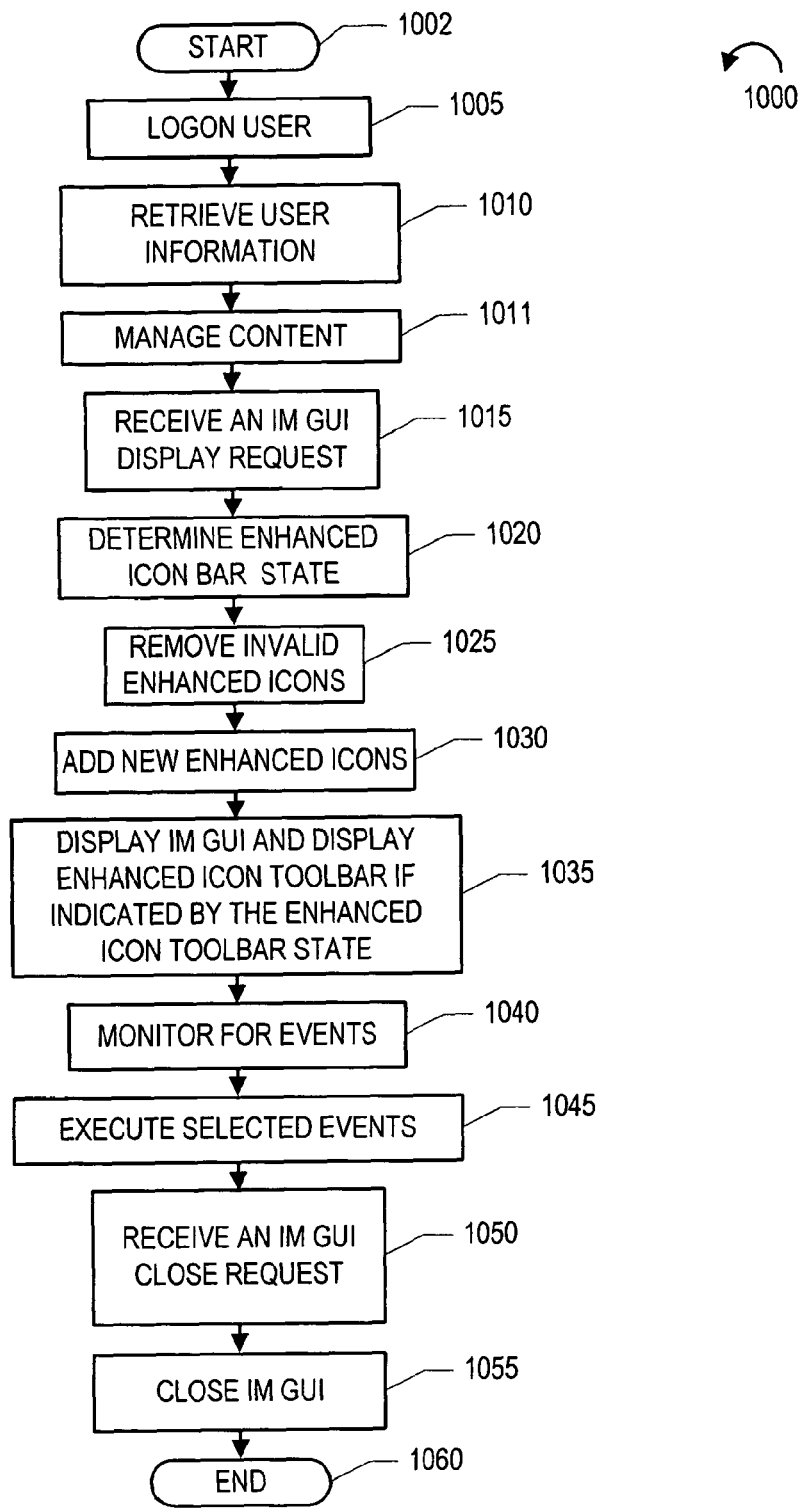
FIG. 10 is a flowchart illustrating an exemplary user side method of the invention.

FIG. 10 illustrates an exemplary user side method 1000 that may be executed by user side module 274, implemented in this non-limiting exemplary embodiment as a messaging program 274, of user computer 130'. Method 1000 starts at step 1002 with a messaging service user 130 initiating a messaging program 274. Processing proceeds to step 1005 where the user logs on to the messaging service. In an embodiment of the invention a messaging service user can set a user preference to log-on manually or automatically. If the user chooses to log-on an automatically, the messaging service user's username and password is cached at the user's computer. After initiation of the messaging program 274, the messaging program 274 automatically sends a log-on request to the content provider, the request comprising the messaging service user's username and password. Alternatively, if the user chooses to log on manually, the messaging program 274 may provide the user with a log-on interface that the user can use to enter their username and password and to send a request to the content provider.

Following step 1005, processing proceeds to step 1010 where the user side module 274 receives user information, for example, through a content manager feed. This user information comprises the messaging service user's preferences for the messaging service and in particular the user's preferences for enhanced icons 210. Enhanced icon preferences include the enhanced icon interface state (hidden/displayed), enable/disable enhanced icons, mute enhanced icons, and display enhanced icon caption proximate to enhanced icon. User content is managed in step 1011.

In the exemplary non-limiting embodiment described in FIG. 10 the messaging program 274 is a program that includes instant messaging and/or chat room messaging. In alternate embodiments the messaging program 274 may also be an e-mail program, a message board program or any program that computer network users use to communicate with each other.

Proceeding from step 1010 to step 1015 the messaging program 274, receives an IM GUI display request. The messaging program 274 receives an IM GUI display request when the messaging service user initiates an IM GUI to send a message to another messaging service user, and the messaging program 274 also receives an IM GUI display request when the messaging program 274 receives a message from another user.

Following step 1015, processing proceeds to step 1020 where the messaging program 274 determines the enhanced icon interface 417 state, (i.e., displayed or hidden). The user's preferences, which could be received in a content manager feed from content manager 311, records the previous state of the enhanced icon interface 417 so that when the user opens an IM GUI the state of the enhanced icon interface 417 is the same as it was the last time an IM GUI was closed.

Processing proceeds from step 1020 to step 1025 where the messaging program 274 removes any invalid enhanced icons 210, and then to step 1030 where the messaging program 274 adds new enhanced icons 210. The content manager feed includes the new enhanced icons 210 and identifies invalid enhanced icons 210. Then method 1000 proceeds from step 1030 to step 1035. In step 1035 the messaging program 274 displays an IM GUI incorporating the preferences determined in the previous steps.

Following step 1035, processing proceeds to step 1040 where the messaging program 274 monitors for events. When an event is received processing proceeds to step 1045 where the received event is executed. Possible events include sending an enhanced icon, displaying an enhanced icon, displaying a context menu, executing an enhanced icon context menu item selection, and initiating an enhance icon dialog. These events are described later in the application. When a messaging service user is finished with a messaging session with another messaging service user, the messaging service users closes the IM GUI. In step 1050, the messaging program 274 receives an IM GUI close request. Then in step 1055 the messaging program 274 closes the IM GUI. Following step 1055, processing proceeds to step 1060 where the method 1000 ends, for example, with messaging service user logging out and closing the messaging program 274.

Figure 11:
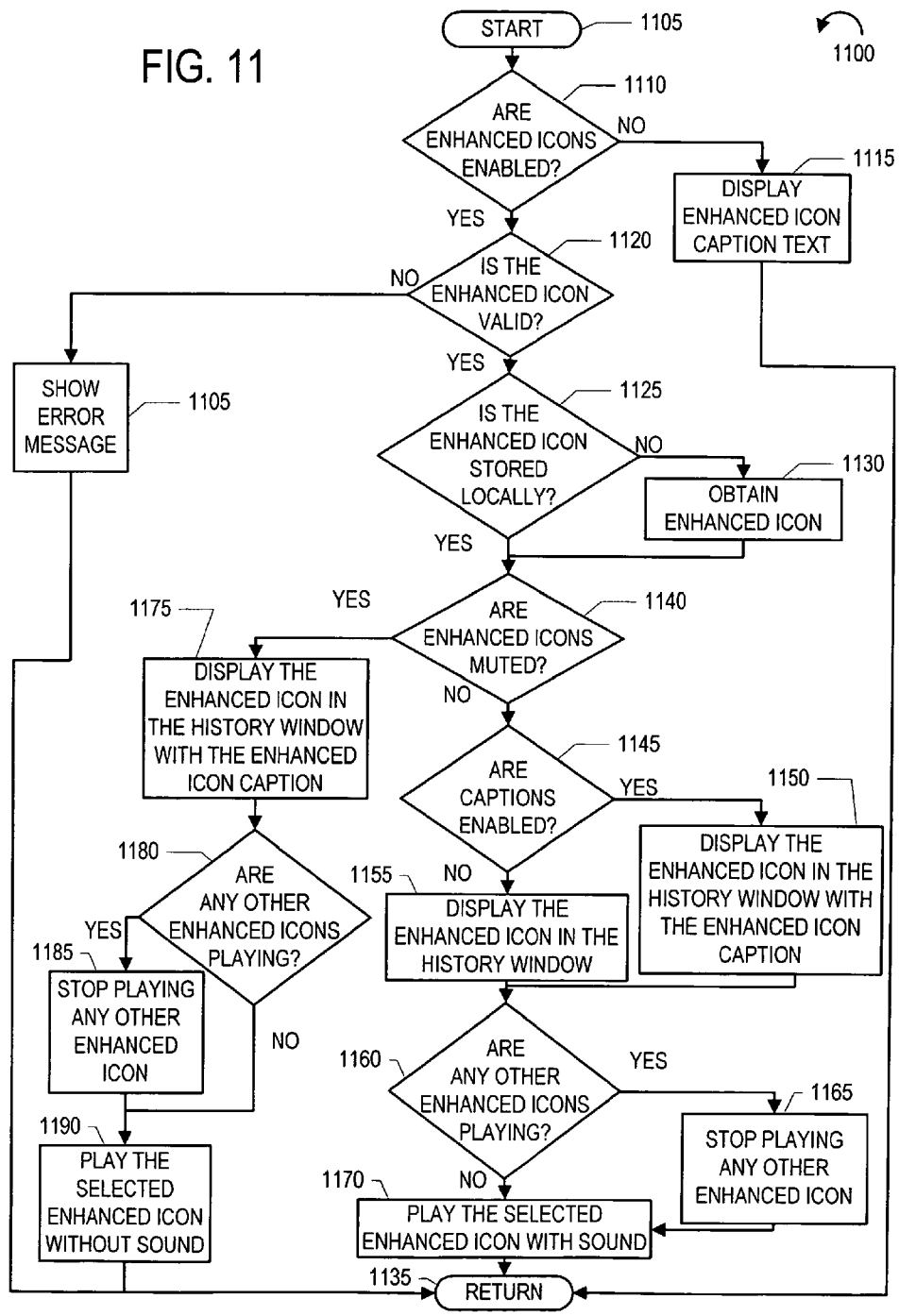
FIG. 11 is a flowchart illustrating an exemplary enhanced icon display method of the invention.

One of the events that may be executed in step 1045 of user side method 1000 is to display an enhanced icon 210. A messaging program 274 receives an indicator to display an enhanced icon 210 in a number of different situations including displaying an enhanced icon 210 in a history window 414 after a messaging service user sends an enhanced icon 210 and displaying an enhanced icon 210 in a history window 414 after a messaging service user receives an enhanced icon 210. FIG. 11 illustrates an exemplary enhanced icon display method 1100. Enhanced icon display method 1100 starts in step 1105, for example, with the user side module 274, implemented as a messaging program 274, receiving an indicator to display an enhanced icon 210.

Processing proceeds from step 1105 to step 1110 where the messaging program 274 determines if enhanced icons 210 are enabled and/or if enhanced icons 210 are even capable on the messaging program 274. Older version of a messaging program 274 that are still compatible with the messaging service may not be able to display enhanced icons 210. Therefore, if enhanced icons 210 are disabled in an enhanced icon 210 capable messaging program 274 and/or if a messaging service user is using a messaging program 274 that is not enhanced icons 210 capable, processing proceeds from step 1110 to step 1115 where the messaging program 274 displays the enhanced icon caption text instead of the enhanced icon 210. A messaging program 274 that is capable of displaying enhanced icons retrieves the enhanced icon caption, which is stored in the enhanced icon 210, from the content specific information 214 of the enhanced icon 210 through the coupling module 205. In an embodiment of the invention, a messaging service message that includes an enhanced icon 210 additionally includes, as part of the message, the text of the enhanced icon's caption. Messaging programs 274 that are not capable of displaying enhanced icons 210 can ignore the enhanced icon 210 and display the text of the enhanced icon caption that is included in the message. Following step 1115, method 1100 proceeds to return step 1135 and the method 1100 returns, for example, to monitoring step 1040 of user side method 1000.

Returning to step 1110 of enhanced icon display method 1100, if enhanced icons 210 are enabled processing proceeds directly from step 1110 to step 1120 where the messaging program 274 determines if the enhanced icon 210 is valid. For example, an enhanced icon would be invalid if it was expired or if it was a foreign enhanced icon 210 not approved by a content provider. If the enhanced icon 210 is not valid, processing proceeds from step 1120 to step 1195 where the user who sent the enhanced icon 210 is shown an error message. The error message can also be delivered to the intended recipient of the enhanced icon 210. Then method 1100 returns in step 1135, for example, to monitoring step 1040 of user side method 1000.

Returning to step 1120 if the enhanced icon 210 is valid, processing proceeds from step 1120 to step 1125. In an exemplary non-limiting embodiment, enhanced icons 210 are assigned identifiers (IDs). Enhanced icon IDs are sent between messaging service users instead of the enhanced icon 210 itself to save bandwidth. A messaging service user can obtain an enhanced icon 210 associated with an enhanced icon ID from the content provider. In order to save time and more bandwidth, enhanced icons 210 are cached at a user's computer. Therefore, in step 1125 the messaging program 274 determines if the enhanced icon 210 is stored locally. If the enhanced icon 210 is not stored locally processing proceeds from step 1125 to step 1130 where the messaging program 274 obtains the enhanced icon 210. The enhanced icon 210 may be stored at a production server, for example, server three 150 at content provider location 120. After obtaining the enhanced icon 210, processing proceeds to step 1130.

Returning to step 1125, if the enhanced icon 210 is available locally processing proceeds directly to step 1140 where the messaging program 274 checks the user's preferences to determine if enhanced icons 210 are muted. If enhanced icons 210 are not muted processing proceeds from step 1140 to step 1145. At step 1145 the messaging program 274 checks the user's preferences to determine if enhanced icon captions are enabled. If captions are enabled, processing proceeds from step 1145 to step 1150 where the messaging program 274 displays the enhanced icon 210 in the history window 414 with the enhanced icon's caption obtained from the content specific information 214 of the enhanced icon 210, through coupling module 205. Returning to step 1145 if enhanced icon captions are not enabled, processing proceeds from step 1145 to step 1155 where the messaging program 274 displays the enhanced icon 210 in the history window 414.

Processing proceeds from step 1155 to step 1160 where the messaging program 274, with the help of coupling module 205, determines if any other enhanced icons 210 are playing. If another enhanced icon 210 is playing processing proceeds from step 1160 to step 1165 where any other enhanced icon 210 that is playing is stopped. Returning to step 1160 if no other enhanced icon 210 is playing processing proceeds from step 1160 to step 1170 where the enhanced icon 210 is played with sound. Then method 1100 returns in step 1135, for example, to step 1040 of user side method 1000.

A messaging program 274 may want to control the number of enhanced icons 210 that play at any given time for security reasons. Malicious users may send more than one enhanced icon 210 to try and disrupt the service or decrease the enjoyment of the service by other messaging program users. Therefore in this exemplary embodiment sending an enhanced icon 210 automatically creates an IM message including the enhanced icon 210 and sends the IM message to an intended recipient. In alternate embodiments a user may first preview the enhanced icon 210 they wish to send in the message compose field 422 before they send the message.

Returning to step 1140 if enhanced icons 210 are muted, processing proceeds from step 1140 to step 1175. In step 1175, the messaging program 274 displays the enhanced icon in the history window 414 with the enhanced icon 210 caption. Then processing proceeds to step 1180 where the messaging program 274 determines if any other enhanced icons 210 are playing, with the help of coupling module 205. If other enhanced icons 210 are playing processing proceeds to step 1185 where the other enhanced icons 210 are stopped. Then processing proceeds to step 1190. Returning to step 1185 if no other enhanced icon 210 is playing, processing proceeds directly to step 1190 where the selected enhanced icon 210 is played without sound. Enhanced icon send method 1100 returns in step 1135, for example, to step 1040 of user side method 1000.

In accordance with an embodiment of the invention, enhanced icons 210 include content specific information 214. For example, the content specific information 214 can include an array of context menu items that are displayed when a user initiates a context menu for an enhanced icon 210. While the content specific menus below are described in the context of an enhanced icon 210, content specific information for context menus can be stored in any media available on the Internet that can store information, for example, avatars of a chat room.

Figure 12:
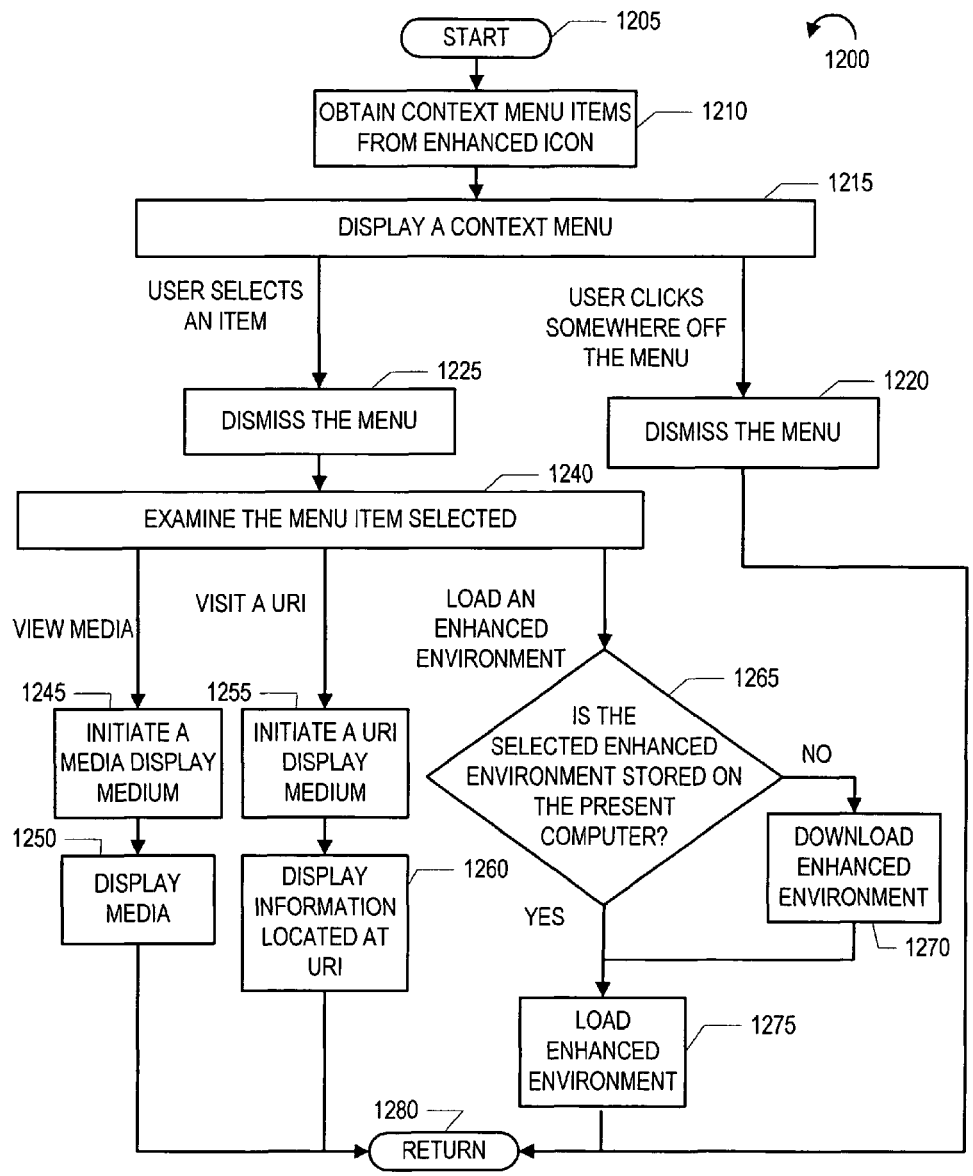
FIG. 12 is a flowchart illustrating an exemplary context menu method of the invention.

FIG. 12 illustrates an exemplary context menu method 1200 that may be executed as a messaging program 274 event in step 1045 of user side method 1000. Processing of context menu method 1200 starts in step 1205 where, for example, the messaging program 274 receives an indication to display a context menu. In accordance with an embodiment of the invention, a messaging service user can open a context menu for an enhanced icon 210 in different ways. For example if an enhanced icon 210 is located in the enhanced icon toolbar 418, right clicking on an enhanced icon 210 displays a context menu. If an enhanced icon 210 is located in the history window, right or left clicking on the enhanced icon 210 displays a context menu. In addition, the messaging program 274 can populate the context menu with different menu items, obtained from the content specific information 214 of the enhanced icon 210, through coupling module 205, depending on the location of the enhanced icon 210 within the messaging program 274. For example an enhanced icon 210 displayed in the enhanced icon toolbar 418 has an option to "Preview Enhanced Icons", while an enhanced icon 210 in the history window 414 has an option to "Play Enhanced Icons".

Processing of method 1200 proceeds to step 1210 where the messaging program 274 obtains content specific context menu items, which may be includes as part of content specific information 214, from the selected enhanced icon 210 through the coupling module 205. The messaging program 274 populates the context menu with the content specific context menu items retrieved from the enhanced icon 210. This relationship allows a content provider to populate enhanced icon context menus with links to additional media related to the user perceptible content 212 of the enhanced icon 210. For example, an enhanced icon 210 depicting a movie character can have context menu items that link to the movie's Website. This interrelationship between different media makes enhanced icons 210 an effective advertising tool. In addition, the messaging program 274 can also populate the context menu with regular content menu items that a user selects to control the enhanced icon such as "Play Enhanced Icon" and "Mute Enhanced Icons." These regular context menu items are preferably not related to the user perceptible content 214 of the enhanced icon 210, therefore they can be stored by the messaging program 274 for display.

Content specific context menu items are stored as part of the enhanced icon 210 as content specific information 214, and are retrieved by the messaging program 274 when a context menu is displayed. In alternate embodiments the content specific information 214 may be retrieved at a remote location or may be retrieved at an earlier time and stored locally at the computer. Following step 1210, in step 1215, the messaging program 274 displays a context menu.

If a user clicks somewhere outside the menu, processing proceeds from step 1215 to step 1220 where the context menu is dismissed and no function is performed. After the context menu is dismissed, processing of method 1200 returns in step 1280, for example, to monitoring step 1040 of user side method 1000. Returning to step 1215, if a user selects a context menu item, processing proceeds from step 1215 to step 1225. In step 1225 the messaging program 274 dismisses the context menu.

Then processing proceeds from step 1225 to step 1240 where the messaging program 274 examines the menu item that was selected for processing. FIG. 12 illustrates three exemplary content specific context menu items, but in alternate embodiments there may be more or less content specific context items. In addition, processing of regular context menu items (not shown) may also occur.

If the selected menu item is a command to view media, such as for example a movie trailer, processing proceeds from step 1240 to step 1245 where the messaging program 274 initiates a media display medium, such as, for example, a video player. Other exemplary non-limiting media include music, pictures, etc. Processing proceeds from step 1245 to step 150 where the media display medium displays the media for perception by the messaging service user. The media can be located by a network identifier included as part of content specific information 214, and can be obtained through the coupling module 205 with the context menu array. Then processing of method 1200 returns in step 1280, for example, to step 1040 of user side method 1000.

Returning to step 1240, if the user selects a context menu item with a command to visit a universal resource identifier (URI), processing proceeds from step 1240 to step 1255 where the messaging program 274 initiates a URI display medium, for example, a Web browser 272. Then processing proceeds from step 1255 to step 1260 where the URI display medium displays the information located at the URI. The URI may be a universal resource locator (URL) to a particular movie's Web page which is related to the enhanced icon 210. The URI can be included as part of content specific information 214, and can be obtained through the coupling module 205 with the context menu array. Then processing of method 1200 returns in step 1280, for example, to step 1040 of user side method 1000.

Returning to step 1240, if the user selects a context menu item with a command to load another messaging service function that is related to the enhanced icon 210, for example, an enhanced messaging environment function, processing proceeds from step 1240 to step 1265. Enhanced messaging environment are created by loading enhanced Internet media, such as, for example, animated pictures and/or user interactive media, into a messaging program GUI. This Internet media may be related to the user perceptible content 212 represented by the enhanced icon 210. Thereby allowing a content provider to offer many different types of advertising media and to link those different types of media together. The environments 217 can also be assigned identifier (IDs), and these environment IDs can be included as part of content specific information 214 that can be obtained through the coupling module 205 with the context menu array.

In step 1265, the messaging program 274 determines if the selected enhanced environment 217 is stored on the present computer. If a selected enhanced environment 217 is not stored on the present computer, processing proceeds from step 1265 to step 1270 where the messaging program 274 downloads the enhanced environment 217. Then processing proceeds from step 1270 to step 1275 where the enhanced environment 217 is loaded. Returning to step 1265 if the enhanced environment 217 is stored locally on the computer, processing proceeds directly from step 1265 to step 1275 where the enhanced environment 217 is loaded. Then method 1200 returns in step 1280, for example, to monitoring step 1040 of user side method 1000.

Figure 13:
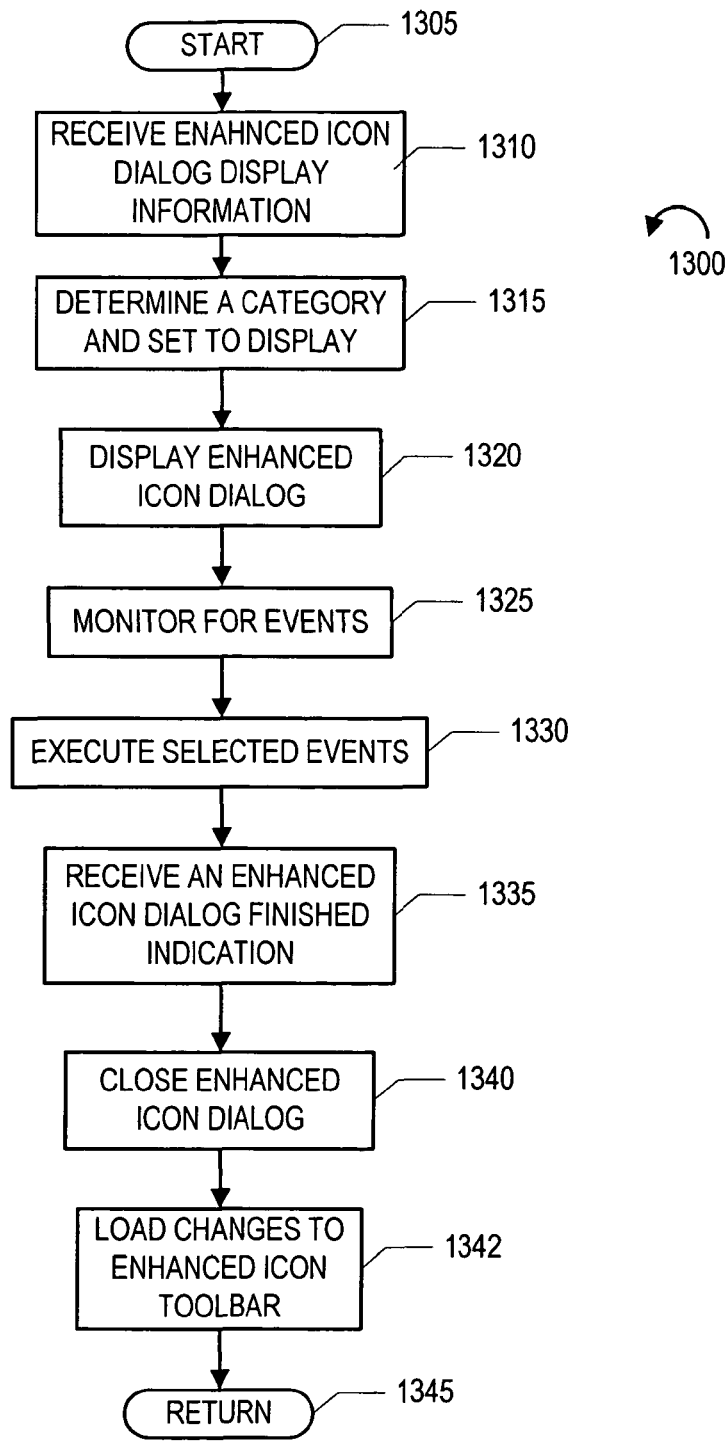
FIG. 13 is a flowchart illustrating an exemplary enhanced icon dialog method of the invention.

A messaging service user can modify their enhanced icon favorites toolbar by selecting the "Browse All" button 440 of IM GUI 400 or by selecting "Find Similar Enhanced Icons" in a context menu. Either of those selections indicates to the messaging program 274 to display an enhanced icon dialog, such as, for example, the enhanced icon dialog 800 of FIG. 8. FIG. 13 illustrates an exemplary enhanced icon dialog method 1300. Processing of enhanced icon dialog method 1300 begins in step 1305, for example, with the messaging program 274 receiving an indicator to display an enhanced icon dialog. Then, processing proceeds from step 1305 to step 1310 where the messaging program 274 receives enhanced icon dialog display information, for example through a feed from the content manager 311. Following step 1310, processing proceeds to step 1315 where the messaging program 274 determines a category and a set to display in the dialog window.

When the messaging service user accesses the enhanced icon dialog by selecting the "Browse All" button 440, a default category and set are displayed, for example, the default category and set may be last category and set that was displayed by the user or the newest category and set of enhanced icons 210 that are available. If the enhanced icon dialog was initiated by selecting the "Find Similar Enhanced Icons" items in a context menu, then the messaging program 274 loads an enhanced icon category and set that is similar to the enhanced icon 210 that was selected.

Processing from step 1315 to step 1320 where the messaging program 274 displays the enhanced icon dialog with the determined category and set. As described earlier and referring to FIG. 8 a user may view available enhanced icons 210 by navigating the different categories and sets. By default when a new category of enhanced icons 210 is selected, the first set of enhanced icons 210 in the category is be loaded.

Following step 1320, processing proceeds to step 1325 where the messaging program 274 monitors for user events. Possible events include selecting a new category, selecting a new set, adding a new enhanced icon to an enhanced icon bar, removing an enhanced icon from an enhanced icon bar, reordering the enhanced icons in an enhanced icon toolbar, previewing enhanced icons, displaying enhanced icon context menu and executing commands selected from the context menu. Then in step 1330 the selected event is executed.

When the messaging service user is finished modifying their enhanced icon toolbar 418 they can dismiss the enhanced icon dialog by, for example, selecting the "Finished" button 830. When the "Finished" button 830 is selected, processing of method 1300 proceeds from step 1330 to step 1335 where the messaging program 274 receives an enhanced icons dialog finished indication. Then processing proceeds from step 1335 to step 1340 where the messaging program 274 closes the enhanced icon dialog. Then, in step 1342, the messaging program 274 loads the changes made to the enhanced icon toolbar 418. Method 1300 then returns in step 1345, for example, to monitoring step 1040 of user side method 1000. In alternate embodiments, a messaging service may include parental controls to allow parents to control the access their children have to certain enhanced icons 210.

In accordance with an embodiment of the invention, the messaging service can offer enhanced icons 210 as a premium service offered to, for example, paying, messaging service users rather than to free messaging service users. In order to implement this limited access scheme, the enhanced icon feature for a particular messaging service user is placed in one of four provisioning states: restricted, plus restricted, plus enabled and open.

Restricted means that enhanced icons 210 are not available to any messaging service user. The users cannot find, select, send or receive enhanced icons 210. Plus restricted means that the user is a free messaging service user and that enhanced icons 210 are available, but the user has not subscribed to the feature. In this state the user may receive enhanced icons 210, but cannot find, select or send enhanced icons 210. Plus enabled means that the user is a premium messaging service user and that enhanced icons 210 are available. In this state the user may find, select, send and receive enhanced icons. Open means that enhanced icons 210 are not part of a premium service and that the feature is available for all users. Provisioning state information is delivered during login. The messaging program 274 receives the provisioning state from the content provider servers.

Figure 14:
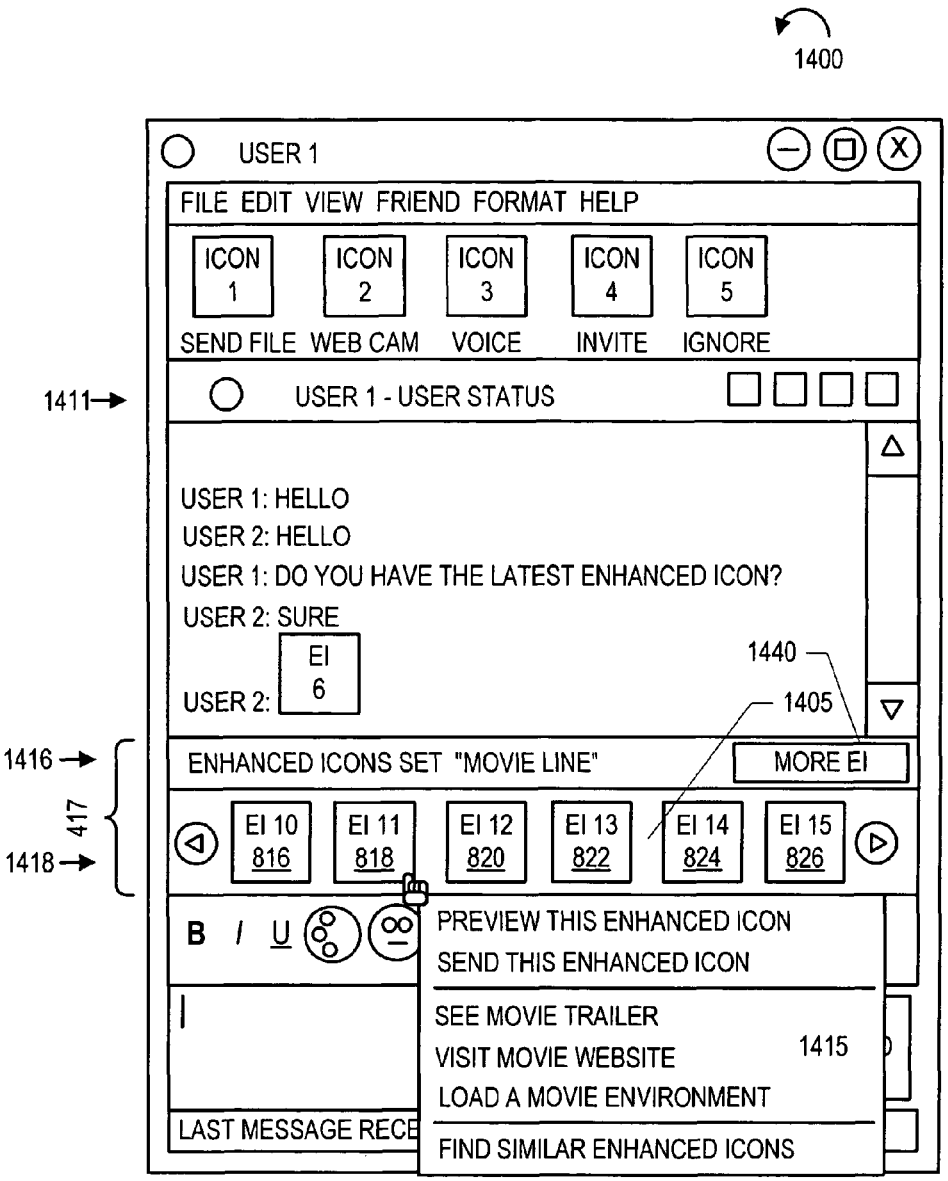
FIG. 14 is an alternative embodiment of an exemplary IM GUI, further displaying a context menu for an enhanced icon in an enhanced icon toolbar.

FIG. 14 illustrates an alternative embodiment of an IM GUI 1400. Parts of IM GUI 1400 that are similar to parts of IM GUI 400 of FIG. 4 are not described. IM GUI 1400 includes an IM user bar 1411. In accordance with the invention, a first messaging service user has an IM GUI 1400 displayed for each messaging service user they are participating in an IM session with. The IM user bar 1411 includes the name of the other messaging service user participating in an IM session. The IM user bar 1411 also includes the status of the other user, for example, the user may be available, working from home, busy, on vacation, etc. IM user bar 1411 also includes buttons for quick access to additional messaging program 274 functions.

FIG. 14 also illustrates an exemplary context menu for an enhanced icon 210 located in the enhanced icon toolbar 1418. The context menu includes the following menu items: "Preview this Enhanced Icon", "Send this Enhanced Icon", one or more content specific enhanced icon menu items, and "Find Similar Enhanced Icons." The content specific enhanced icon menu items 1415 are related to the movie associated with the enhanced icons.

The enhanced icon interface 1417 of IM GUI 1400 operates in accordance with an alternate embodiment of the invention. A messaging service provider is not limited to one embodiment of the invention. The messaging service provider can offer both embodiments and/or a combination of different aspects of the embodiments. The enhanced icon interface 1417 is comprised of an enhanced icon caption area 1416 and an enhanced icon toolbar 1418.

Instead of displaying a messaging service user's favorite enhanced icons 210, the enhanced icon toolbar 1418 displays all the enhanced icons 210 of a selected set. For example the enhanced icon toolbar 1418 includes a set of one-liners from a movie, i.e., enhanced icons ten through fifteen 816, 818, 820, 822, 824, 826. The name of the set is displayed in enhanced icon caption area 1416. In addition, when a pointer is placed over a particular enhanced icon 210, the enhanced icon caption, which is included as part of content specific information 214 of the particular enhanced icon 210, is obtained by the coupling module 205 and displayed in the enhanced icon caption area 1416.

Figure 15:
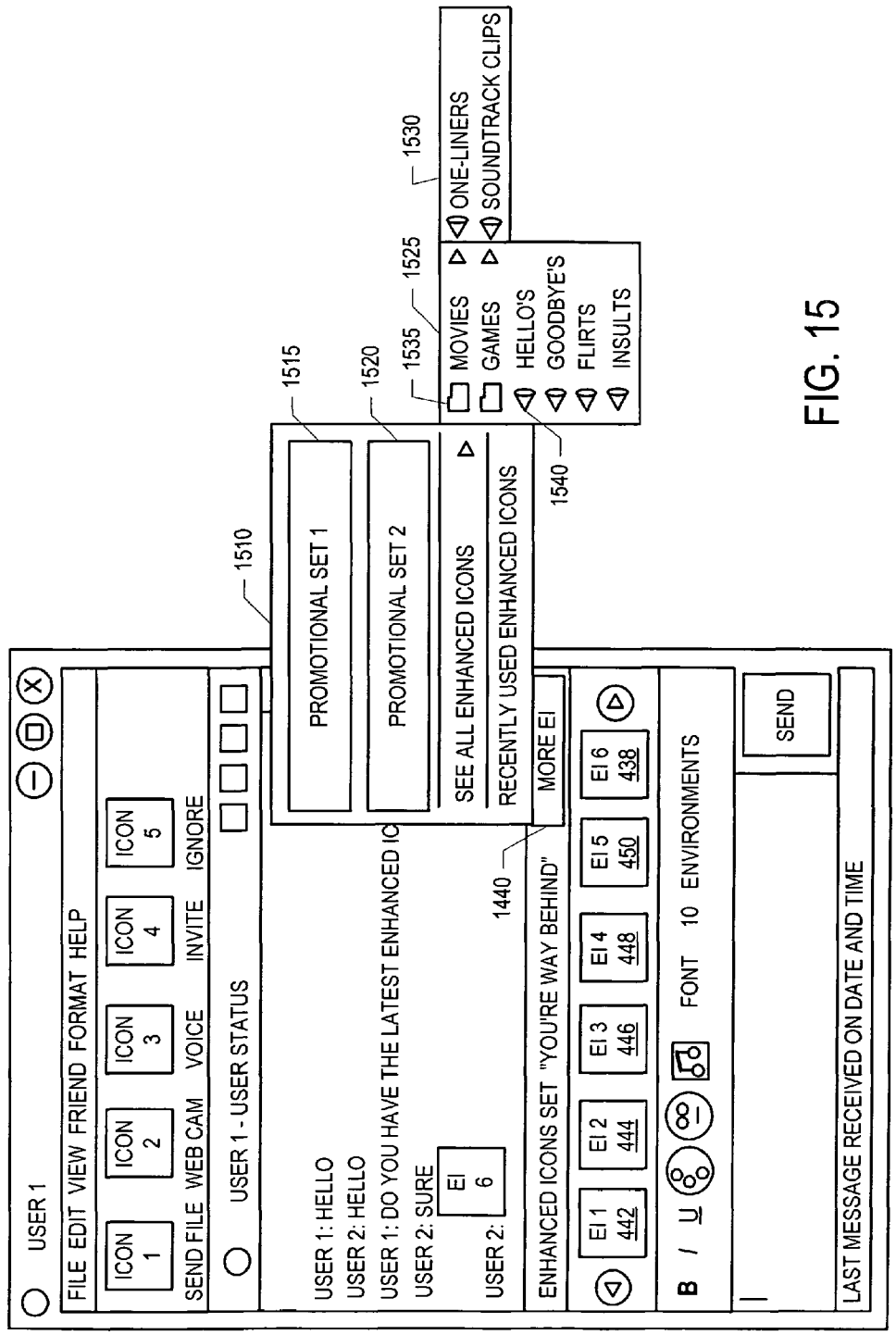
FIG. 15 is a flowchart illustrating an exemplary enhanced icon menu of the invention.

The enhanced icon caption area 1416 also includes a button 1440 labeled "More Enhanced Icons" that a messaging service user can select to change the set displayed in their enhanced icon toolbar 1418. FIG. 15 illustrates exemplary menus 1510, 1525, 1530 that can be displayed by a user to select an enhanced icon set for their enhanced icon toolbar 1418. In one exemplary non-limiting embodiment, the menus 1510, 1525, 1530 are populated using information received in a feed from the messaging service provider.

When a user selects the "More enhanced icons" button 1440, a first menu 1510 is displayed. The first menu 1510 includes promotional sets one and two 1515, 1520, and may include more promotional sets. These promotional sets may be used by the messaging service provider to prominently display, for example, newly added sets and/or preferred marketing partner sets. The promotional sets can display an image, for example an advertisement. Since the menu 1510 is populated with information from a feed, the displayed promotional sets can be controlled by the messaging service provider. The first menu 1510 also includes an item to display recently used enhanced icons in the enhanced icon toolbar 1418, for example the last thirty enhanced icons used by a particular messaging service user.

Some menu items display submenus. These menu items are distinguished, for example, by an arrow at the end of the menu item. When the "See all enhanced icons" menu item of menu 1510 is selected, a second menu 1525 is displayed. This menu includes enhanced icon categories, represented by a folder 1535, and enhanced icon sets, represent by a speaker 1540. Selecting an enhanced icon set dismisses the menus 1510, 1525, and loads the selected set of enhanced icons 210 in the enhanced icon toolbar 1418. Selecting an enhanced icon category displays a third menu 1530, that includes enhanced icon sets comprising the selected category. A user can select one of these enhanced icon sets to load in their enhanced icon toolbar 1418.

Figure 16:
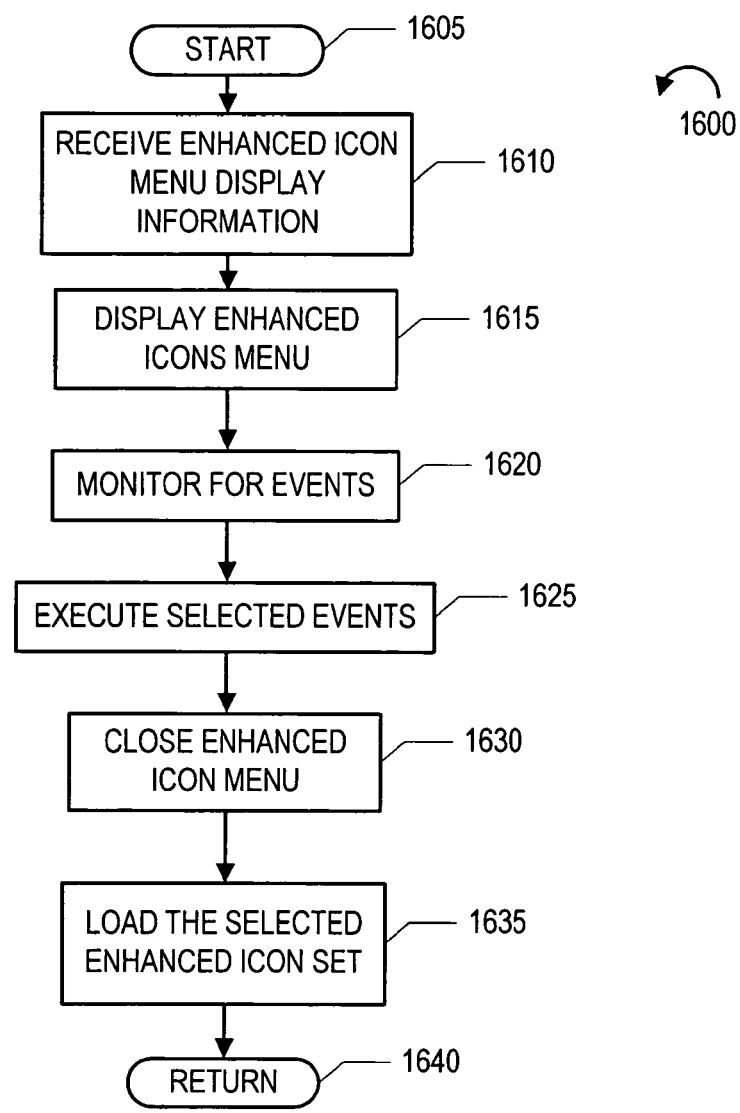
FIG. 16 is a flowchart illustrating an exemplary enhanced icon menu method of the invention.

FIG. 16 illustrates an exemplary enhanced icon menu method 1600 for selecting enhanced icon sets to display in an enhanced icon toolbar 1418. The method starts in step 1605, for example, with a messaging service user selecting the "More enhanced icons" button 1440. In step 1610, the messaging program 274 receives enhanced icon menu display information from content manager 311. This information includes the promotional sets and the menu items for the various menus.

Following step 1610, processing proceeds to step 1615 where the messaging program uses the received enhanced icon menu display information to display an enhanced icon menu. Then, in step 1620, the messaging program 274 monitors for events from the user. These events can include selecting an enhanced icon set or displaying another menu. The selected events are executed in step 1625.

Following step 1625, processing proceeds to step 1630, where the messaging program 274 closes the enhanced icon menu 1510. Then, in step 1635, the messaging program 274 loads the selected set into the enhanced icon toolbar 418. Method 1600 then returns in step 1640, for example, to monitoring step 1040 of user side method 1000.

While the embodiment above describes enhanced icons 210 used with an IM program, enhanced icons 210 can be used with any computer network communication medium, such as for example chat rooms, email and message boards. In addition, while the content specific context menu items are described in conjunction with enhanced icons 210, the content specific context menu items are not limited to enhanced icons 210. Content specific context menu items can be implemented with any Internet media. While there have been shown and described and pointed out fundamental novel features of the invention as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

The invention claimed is:

1. A method of providing a rich media icon for enhancing user interaction with a messaging program comprising the steps of:
   providing, by a processor, access to a selection of user selectable rich media icons through a messaging program interface which may be used to create a message containing a user selected rich media icon, said rich media icon comprises user perceptible content and content specific information, the user perceptible content associated with content selected from a group of content types consisting of one or more products and one or more services and the content specific information related to the user perceptible content; and
   providing computer code to allow communication between the rich media icon and the messaging program so that the messaging program and said rich media icon can inter-operate, and so that when said message is communicated to an intended recipient via the messaging program, said message is communicated with said rich media icon to said intended recipient so as to enable a perception of said content and access to said rich media icon by said intended recipient so that said intended recipient can interact with said rich media icon and utilize said content specific information, said content specific information displaying a rich media caption when a cursor is positioned over said rich media icon, said rich media caption comprising a description of the user perceptible content,
   providing computer code to allow a user to disable said rich media icons in the messaging program, and when the messaging program receives an indication to display a rich media icon, the messaging program displays the rich media caption in place of the rich media icon.

2. The method of claim 1, further comprising the step of collecting user statistics related to the usage of said rich media icon.

3. The method of claim 1, further comprising the step of collecting user statistics related to the messaging program.

4. The method of claim 1, wherein the rich media icon is assigned an identification tag, and wherein a created message contains a rich media icon identification tag, the rich media icon being accessible from a server using said rich media icon identification tag.

5. The method of claim 1, wherein said selection of user selectable rich media icons may be modified by a content provider by adding a new or a recommended rich media icon and removing expired rich media icons.

6. The method of claim 5, wherein the content provider modifies the selection of user selectable rich media icons through a feed from a content manager operated by said content provider.

7. The method of claim 5, wherein an object is displayed proximate to at least some portion of the rich media icon to indicate to a user that the rich media icon is newly added to said selection.

8. The method of claim 1, wherein said computer code controls said messaging program so that the messaging program can selectively stop playing a selected rich media icon and start playing a newly selected rich media icon.

9. The method of claim 1, further comprising providing a rich media interface through which said user can modify said selection of user selectable rich media icons.

10. The method of claim 9, wherein the rich media interface comprises a plurality of rich media icon selections, received from a content provider, from which a user can select additional rich media icons.

11. The method of claim 9, wherein said rich media interface is a dialog comprising a plurality of rich media icon selections, a current rich media icon selection, an add rich media icon function, a remove rich media icon function and a reorder rich media icon function.

12. The method of claim 9, wherein said rich media icon interface is a menu, which can comprise submenus, comprising a plurality of rich media icon selections.

13. The method of claim 9, wherein said plurality of rich media icon selections comprises a recently used rich media icon selection.

14. The method of claim 1, wherein a user can disable said rich media icons in the messaging program.

15. The method of claim 1, wherein said user perceptible data of said rich media icon relates to a movie.

16. The method of claim 15, wherein said rich media icon comprises a character from said movie, and wherein said rich media icon speaks a line from said movie.

17. The method of claim 1, wherein said user perceptible data of said rich media icon comprises a musical album of a recording artist and said rich media icon relates to said recording artist, and wherein said rich media icon plays a clip from said musical album.

18. The method of claim 1, wherein said messaging program comprises a feature for loading environments that enhance a messaging program interface.

19. The method of claim 18, wherein the rich media icon interacts with the loaded environment.

20. The method of claim 1, wherein said content specific information comprises a context menu item selected from the group consisting of: (a) a display string, (b) a resource identifier and (c) a command.

21. The method of claim 20, further comprising organizing a plurality of rich media icons into sets identified by a set identifier and organizing said sets into categories identified by a category identifier.

22. The method of claim 20, wherein said computer code controls said messaging program and utilizes said content specific information to display a context menu.

23. The method of claim 22, further comprising selectively populating said context menu with different context menu items.

24. The method of claim 22, wherein said computer code controls said messaging program so that said messaging program displays different context menu items in said context menu depending on the location of said rich media icon within said messaging program.

25. The method of claim 20, wherein said resource identifier comprises at least one of the following two items:
   (i) a universal resource identifier representing the location of data related to the user perceptible content of an icon of rich media; and
   (ii) a messaging program resource identifier representing enhanced features of the messaging program that are related to the user perceptible content of an icon of rich media.

26. The method of claim 20, wherein said resource identifier comprises a universal resource identifier representing the location of data related to the user perceptible content of an icon of rich media.

27. The method of claim 20, wherein said resource identifier comprises a messaging program resource identifier representing enhanced features of the messaging program that are related to the user perceptible content of an icon of rich media.

28. The method of claim 20, wherein said command comprises at least one of the following seven commands:
    (i) open a new browser window and load data located at a resource identifier;
    (ii) load another messaging program feature;
    (iii) replay the rich media icon;
    (iv) add the rich media icon to a user selection of rich media icons;
    (v) display a rich media interface wherein a user is presented with a plurality of rich media icons that comprises rich media icons that are similar to a selected rich media icon so that the user can add similar rich media icons to their selection;
    (vi) mute rich media icons, wherein when the messaging program receives a rich media icon, the messaging program displays a description of the user perceptible content proximate to the rich media icon; and
    (vii) mute rich media icons, wherein when the messaging program receives a rich media icon, the messaging program displays a textual transcription of words to be audibly perceived as part of the user perceptible content proximate to the rich media icon.

29. The method of claim 1, wherein said rich media caption comprises a textual transcription of words to be audibly perceived as part of the user perceptible content.

30. The method of claim 1, further comprising said computer code obtaining said rich media caption from said content specific information.

31. The method of claim 1, wherein said message further comprises the rich media caption as text in said message.

32. The method of claim 1, further comprising said computer code obtaining the rich media caption from a remote Internet source.

33. A system for providing a rich media icon for enhancing user interaction with a messaging program comprising:
    a server computer for communicating with a messaging program that is operative on a first computer for:
        providing access to a selection of user selectable rich media icons through a messaging program interface which may be used to create a message containing a user selected rich media icon, said rich media icon comprises user perceptible content and content specific information, the user perceptible content associated with content selected from a group of content types consisting of one or more products and one or more services and the content specific information related to the user perceptible content; and
        providing computer code to allow communication between the rich media icon and the messaging program so that the messaging program and said rich media icon can inter-operate, and so that when said message is communicated to an intended recipient via the messaging program, said message is communicated with said rich media icon to said intended recipient so as to enable perception of said content and access to said rich media icon by said intended recipient so that said intended recipient can interact with said rich media icon and utilize said content specific information, said content specific information displaying a rich media caption when a cursor is positioned over said rich media icon, said rich media caption comprising a description of the user perceptible content,
        providing computer code to allow a user to disable said rich media icons in the messaging program, and when the messaging program receives an indication to display a rich media icon, the messaging program displays the rich media caption in place of the rich media icon.

34. The system of claim 33, wherein said server computer provides an operation from the group consisting of:
    (i) offering said messaging program to Internet users;
    (ii) operating a messaging service for users of said messaging program;
    (iii) storing messaging service user messaging program preferences; and
    (iv) storing said rich media for access by messaging service users.

35. The system of claim 34, wherein the server computer operation further comprises:
    (v) offering an interface for marketing partners through which new rich media may be added icons into the messaging service.
    (vi) offering an interface for marketing partners to modify rich media icons already added to the messaging service.

36. The system of claim 34, wherein the server computer operation further comprises storing instant message environments.

37. A non-transitory computer readable storage medium storing computer program instructions capable of being executed by a computer processor, the computer program instructions defining the steps of:
    providing access to a selection of user selectable rich media icons through a messaging program interface which may be used to create a message containing a user selected rich media icon, said rich media icon comprises user perceptible content and content specific information, the user perceptible content associated with content selected from a group of content types consisting of one or more products and one or more services and the content specific information related to the user perceptible content; and
    allowing communication between the rich media icon and the messaging program so that the messaging program and said rich media icon can inter-operate, and so that when said message is communicated to an intended recipient via the messaging program, said message is communicated with said rich media icon to said intended recipient so as to enable perception of said content and access to said rich media icon by said intended recipient so that said intended recipient can interact with said rich media icon and utilize said content specific information, said content specific information displaying a rich media caption when a cursor is positioned over said rich media icon, said rich media caption comprising a description of the user perceptible content,
    allowing a user to disable said rich media icons in the messaging program, and when the messaging program receives an indication to display a rich media icon, the messaging program displays the rich media caption in place of the rich media icon.

38. The non-transitory computer readable storage medium of claim 37, further comprising computer program instructions defining the step of collecting user statistics related to the usage of said rich media icon.

39. The non-transitory computer readable storage medium of claim 37, further comprising computer program instructions defining the step of collecting user statistics related to the messaging program.

40. The non-transitory computer readable storage medium of claim 37, wherein said computer code controls said messaging program so that the messaging program can selectively stop playing a selected rich media icon and start playing a newly selected rich media icon.

41. The non-transitory computer readable storage medium of claim 37, further comprising computer program instructions defining the step of providing a rich media interface through which said user can modify said selection of user selectable rich media icons.

42. The non-transitory computer readable storage medium of claim 41, wherein the rich media interface comprises a plurality of rich media icon selections, received from a content provider, from which a user can select additional rich media icons.

43. The non-transitory computer readable storage medium of claim 41, wherein said rich media interface is a dialog comprising a plurality of rich media icon selections, a current rich media icon selection, an add rich media icon function, a remove rich media icon function and a reorder rich media icon function.

44. The non-transitory computer readable storage medium of claim 41, wherein said rich media icon interface is a menu, which can comprise submenus, comprising a plurality of rich media icon selections.

45. The non-transitory computer readable storage medium of claim 41, wherein said plurality of rich media icon selections comprises a recently used rich media icon selection.

46. The non-transitory computer readable storage medium of claim 37, wherein said content specific information comprises information selected from a context menu item selected from the group consisting of: (a) a display string, (b) a resource identifier and (c) a command.

* * * * *